United States Patent
Baker

(10) Patent No.: US 11,915,152 B2
(45) Date of Patent: Feb. 27, 2024

(54) LEARNING COACH FOR MACHINE LEARNING SYSTEM

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 16/496,585

(22) PCT Filed: Mar. 5, 2018

(86) PCT No.: PCT/US2018/020887
§ 371 (c)(1),
(2) Date: Sep. 23, 2019

(87) PCT Pub. No.: WO2018/175098
PCT Pub. Date: Sep. 27, 2018

(65) Prior Publication Data
US 2020/0311572 A1 Oct. 1, 2020

Related U.S. Application Data

(60) Provisional application No. 62/476,280, filed on Mar. 24, 2017.

(51) Int. Cl.
*G06N 5/04* (2023.01)
*G06N 20/00* (2019.01)

(52) U.S. Cl.
CPC ............ *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| 5,214,746 A | 5/1993 | Fogel et al. |
| 6,067,535 A * | 5/2000 | Hobson ............ G06N 3/02 706/10 |

(Continued)

FOREIGN PATENT DOCUMENTS

| CN | 100501770 C | 6/2009 |
| EP | 3144859 A2 | 3/2017 |

(Continued)

OTHER PUBLICATIONS

International Search Report and Written Opinion of the International Searching Authority for International Application No. PCT/US2018/020887 dated May 30, 2018.

(Continued)

*Primary Examiner* — Omar F Fernandez Rivas
*Assistant Examiner* — Tri T Nguyen
(74) *Attorney, Agent, or Firm* — K&L Gates LLP

(57) ABSTRACT

A machine learning (ML) system includes a student ML system, a learning coach ML system, and a reference system that generates training data for the student ML system. The learning coach ML system learns to make an enhancement to the student ML system or to its learning process, such as updated hyperparameter or a network structural change, based on training of the student ML system with the training data generated by the reference system. The system may also comprise a learning experimentation system that communicates with the reference system to conduct experiments on the learning of the student learning system. Also, the learning experimentation system can determine a cost function for the learning coach ML system.

27 Claims, 20 Drawing Sheets

(56) References Cited

U.S. PATENT DOCUMENTS

| | | | |
|---|---|---|---|
| 6,289,275 B1 | 9/2001 | Stander | |
| 7,062,476 B2* | 6/2006 | Mims | G06N 3/08 |
| | | | 706/15 |
| 8,014,591 B2 | 9/2011 | Baker | |
| 8,180,147 B2 | 5/2012 | Baker | |
| 8,331,656 B2 | 12/2012 | Baker | |
| 8,331,657 B2 | 12/2012 | Baker | |
| 8,973,096 B1 | 3/2015 | Villa et al. | |
| 9,015,093 B1 | 4/2015 | Commons | |
| 9,336,483 B1 | 5/2016 | Abeysooriya et al. | |
| 9,514,414 B1* | 12/2016 | Rosswog | G06N 7/005 |
| 10,387,795 B1* | 8/2019 | Oldridge | G06N 5/04 |
| 10,410,114 B2 | 9/2019 | Kang et al. | |
| 10,572,823 B1* | 2/2020 | Feinman | G06F 21/56 |
| 2002/0128834 A1 | 9/2002 | Fain et al. | |
| 2003/0024993 A1 | 2/2003 | Gould et al. | |
| 2003/0040904 A1 | 2/2003 | Whitman et al. | |
| 2003/0191728 A1* | 10/2003 | Kulkarni | G06N 3/086 |
| | | | 706/21 |
| 2004/0059695 A1 | 3/2004 | Xiao et al. | |
| 2004/0088163 A1 | 5/2004 | Schalwyk | |
| 2007/0271075 A1 | 11/2007 | Chen et al. | |
| 2007/0288410 A1 | 12/2007 | Tomkins et al. | |
| 2008/0077544 A1 | 3/2008 | Sureka | |
| 2008/0183685 A1 | 7/2008 | He et al. | |
| 2010/0166320 A1 | 7/2010 | Paquier | |
| 2011/0075851 A1 | 3/2011 | Leboeuf et al. | |
| 2011/0098999 A1 | 4/2011 | Amini et al. | |
| 2011/0190657 A1 | 8/2011 | Zhou et al. | |
| 2012/0158620 A1* | 6/2012 | Paquet | G06N 20/00 |
| | | | 706/12 |
| 2013/0238533 A1 | 9/2013 | Virkar et al. | |
| 2014/0149112 A1 | 5/2014 | Kalinli-Akbacak | |
| 2014/0156575 A1 | 6/2014 | Sainath et al. | |
| 2014/0236578 A1 | 8/2014 | Malon et al. | |
| 2014/0257805 A1 | 9/2014 | Huang et al. | |
| 2015/0006444 A1 | 1/2015 | Tamatsu et al. | |
| 2015/0106310 A1 | 4/2015 | Birdwell et al. | |
| 2015/0127327 A1* | 5/2015 | Bacchiani | G10L 25/30 |
| | | | 704/202 |
| 2015/0161232 A1 | 6/2015 | Kosko | |
| 2015/0186798 A1 | 7/2015 | Vasseur et al. | |
| 2015/0206048 A1 | 7/2015 | Talathi et al. | |
| 2015/0242760 A1 | 8/2015 | Miao et al. | |
| 2015/0254555 A1* | 9/2015 | Williams, Jr. | G06N 3/0454 |
| | | | 706/14 |
| 2015/0324689 A1* | 11/2015 | Wierzynski | G06N 3/049 |
| | | | 706/20 |
| 2015/0340032 A1* | 11/2015 | Gruenstein | G06N 3/0454 |
| | | | 704/232 |
| 2015/0347096 A1 | 12/2015 | Hanna | |
| 2015/0363197 A1 | 12/2015 | Carback, III et al. | |
| 2016/0078339 A1* | 3/2016 | Li | G06N 3/084 |
| | | | 706/20 |
| 2016/0091913 A1 | 3/2016 | Pani | |
| 2016/0132786 A1 | 5/2016 | Balan et al. | |
| 2016/0217367 A1 | 7/2016 | Moreno et al. | |
| 2016/0224903 A1 | 8/2016 | Talathi et al. | |
| 2016/0275374 A1 | 9/2016 | Zhu et al. | |
| 2016/0321540 A1 | 11/2016 | Towal | |
| 2016/0335550 A1 | 11/2016 | Achin et al. | |
| 2016/0364522 A1 | 12/2016 | Frey et al. | |
| 2017/0024642 A1 | 1/2017 | Xiong et al. | |
| 2017/0024644 A1 | 1/2017 | Van Der Made et al. | |
| 2017/0061326 A1 | 3/2017 | Talathi et al. | |
| 2017/0068888 A1 | 3/2017 | Chung et al. | |
| 2017/0103298 A1 | 4/2017 | Ling et al. | |
| 2017/0109628 A1 | 4/2017 | Gokmen et al. | |
| 2017/0132528 A1* | 5/2017 | Aslan | G06N 20/00 |
| 2017/0213156 A1* | 7/2017 | Hammond | G06F 8/31 |
| 2017/0228639 A1* | 8/2017 | Hara | G06N 3/08 |
| 2018/0005111 A1* | 1/2018 | Chaudhari | G06N 3/084 |
| 2018/0174044 A1* | 6/2018 | Na | G06N 3/0454 |
| 2018/0211164 A1* | 7/2018 | Bazrafkan | G06N 3/088 |
| 2018/0240257 A1* | 8/2018 | Li | G06N 3/084 |
| 2018/0336465 A1 | 11/2018 | Kim et al. | |

FOREIGN PATENT DOCUMENTS

| | | |
|---|---|---|
| WO | WO 01/26026 A2 | 4/2001 |
| WO | WO 01/26026 A3 | 4/2001 |
| WO | WO2014182549 A1 | 11/2014 |
| WO | WO 2015/126858 A1 | 8/2015 |
| WO | WO20160037351 A1 | 3/2016 |
| WO | WO20160132145 A1 | 8/2016 |
| WO | WO20170062635 A1 | 4/2017 |

OTHER PUBLICATIONS

International Preliminary Report on Patentability for International Application No. PCT/US2018/020887 completed May 29, 2019.

Bhagoji et al. "Enhancing Robustness of Machine Learning Systems via Data Transformations," In: Cornell University Library, Cryptography and Security, Apr. 9, 2017, [online] [retrieved on Oct. 10, 2018 (Oct. 10, 2018)] Retrieved from the Internet URL:https://arxiv.org/abs/1704.02654 (15 pages).

Boutsinas et al. "Artificial nonmonotonic neural networks," In: Artificial Intelligence. vol. 132, ssue 1, Oct. 2001, [online] [retrieved on Oct. 10, 2018 (Oct. 10, 2018)] Retrieved from the Internet <URL: https://www.sciencedirect.com/science/article/pii/S0004370201001266> (38 pages).

Gulcehre et al. "Noisy Activation Functions," In: Cornell University Library, Machine Learning, Mar. 1, 2016, [online] [retrieved on Oct. 10, 2018 (Oct. 10, 2018)) Retrieved from the Internet <URL: https://arxiv.org/abs/1603.00391> (10 pages).

Sermanet et al. "Pedestrian detection with unsupervised multi-stage feature learning." In: IEEE Conference on Computer Vision and Pattern Recognition (CVPR). Jun. 28, 2013; Retrieved from http://openaccess.thecvf.com/content_cvpr_2013/papers/Sermanet_Pedestrian_Detection_with_2013_CVPR_paper.pdf (11 pages).

Trapeznikov et al. "Multi-stage classifier design," In: Asian conference on machine learning. May 14, 2013; Retrieved from http://proceedings.mlr.press/v25/trapeznikov12/trapeznikov12.pdf (33 pages).

Excerpts, I. Goodfellow et al., Deep Learning, MIT Press, 2016, pp. i-xi, 1-26, 94-220, 409-430, PART 1 of 4.

Excerpts, I. Goodfellow et al., Deep Learning, MIT Press, 2016, pp. i-xi, 1-26, 94-220, 409-430, PART 2 of 4.

Excerpts, I. Goodfellow et al., Deep Learning, MIT Press, 2016, pp. i-xi, 1-26, 94-220, 409-430, PART 3 of 4.

Excerpts, I. Goodfellow et al., Deep Learning, MIT Press, 2016, pp. i-xi, 1-26, 94-220, 409-430, PART 4 of 4.

\* cited by examiner

LEARNING COACH FOR MACHINE LEARNING SYSTEM

PRIORITY CLAIM

This application is a National Stage application of international application Serial No. PCT/US2018/020887, filed Mar. 5, 2018, which claims priority to U.S. provisional patent application Ser. No. 62/476,280, filed Mar. 24, 2017, entitled "Learning Coach for Machine Learning System," which is incorporated herein by reference in its entirety.

CROSS-REFERENCE TO RELATED APPLICATIONS

The present application is related to PCT application PCT/US17/52037, filed Sep. 18, 2017, having the same title and inventor as the present application, which is incorporated herein by reference in its entirety.

BACKGROUND

Machine learning is a process implemented by computers to self-learn algorithms that can make predictions on data through building models from sample data inputs, without being explicitly programmed to do so. There are many types of machine learning system types, such as artificial neural networks (ANNs), decision trees, support vector machines (SVMs), and others. These systems first have to be trained on some of the sample inputs before making meaningful predictions with new data. For example, an ANN typically consists of multiple layers of neurons. Each neuron is connected with many others, and links can be enforcing or inhibitory in their effect on the activation state of connected neurons. Each individual neural unit may have a summation function which combines the values of all its inputs together. There may be a threshold function or limiting function on each connection and on the neuron itself, such that the signal must surpass the limit before propagating to other neurons. The weight for each respective input to a node can be trained by back propagation of the partial derivative of an error cost function, with the estimates being accumulated over the training data samples. A large, complex ANN can have millions of connections between nodes, and the weight for each connection has to be learned.

SUMMARY

In one general aspect, the present invention is directed to a computer system that comprises one or more "student" machine learning systems along with at least one "coach" machine learning system. The coach machine learning system itself uses machine learning to help the student machine learning system(s). For example, by monitoring a student machine learning system, the coach machine learning system can learn (through machine learning techniques) "hyperparameters" for the student machine learning system that control the machine learning process for the student learning system. For example, in the case where the student machine learning system uses a deep neural network (DNN), the learned hyperparameters can include the minibatch size M, the learning rate the regularization parameter $\lambda$, and/or the momentum parameter $\mu$. Also, one set of learned hyperparameters could be used to determine all of the weights of the student machine learning system's network, or customized learned hypermeters can be used for different weights in the network. For example, each weight (or other trainable parameter) of the student learning system could have its own set of customized learned hyperparameters that are learned by the learning system coach.

Additionally or in lieu of learning the hyperparameters, the machine learning coach could determine structural modifications for the student learning system architecture. For example, where the student learning system uses a DNN, the machine learning coach can modify the structure of the DNN, such as by adding or deleting layers and/or by adding or deleting nodes in layers. Additionally, the student learning system might include an ensemble of machine learning system. The learning coach in such a scenario could control the data flow to the various machine learning systems and/or add members to the ensemble.

The student learning system(s) and machine learning coach preferably operate in parallel. That is, the machine learning coach observes the student learning system(s) while the student learning system(s) is/are in the learning process and the machine learning coach makes its changes to the student learning system(s) (e.g., hyperparameters, structural modifications, etc.) while the student learning system(s) is/are in the learning process. The learning coach and the student(s) may be the same or different types of machine learning architectures.

The learning coach can have an objective function distinct from the objective of the student learning system(s). For example, the student learning system may minimize the error rate or some other measure of the cost of the errors, while the learning coach makes structural modifications to the student learning system to optimize some combination of the cost of errors and the cost of performing the computation. The learning coach can also make modifications to the student learning system, especially additions, to improve its capabilities while guaranteeing that there will be no degradation in performance.

In addition, in another general aspect, the system can comprise a computerized reference system for generating a set of training data for the student system. The learning coach learns the enhancement to the student system based on training of the student system with the set of training data generated by the reference system. Still further, the system could comprise a learning experimentation system that generates a control parameter for the reference system that controls generation of the set of training data by the reference system. For example, the learning experimentation system can control the reference system such that the student is trained to imitate the reference system. Also, the learning experimentation system can determine a cost function for the learning coach based on observations from the reference system and the student. The learning coach can use the cost function in learning the enhancement for the student.

These and other benefits of the present invention are apparent from the description herein.

FIGURES

Various embodiments of the present invention are described herein by way of example in connection with the following figures, wherein.

Figure 13:
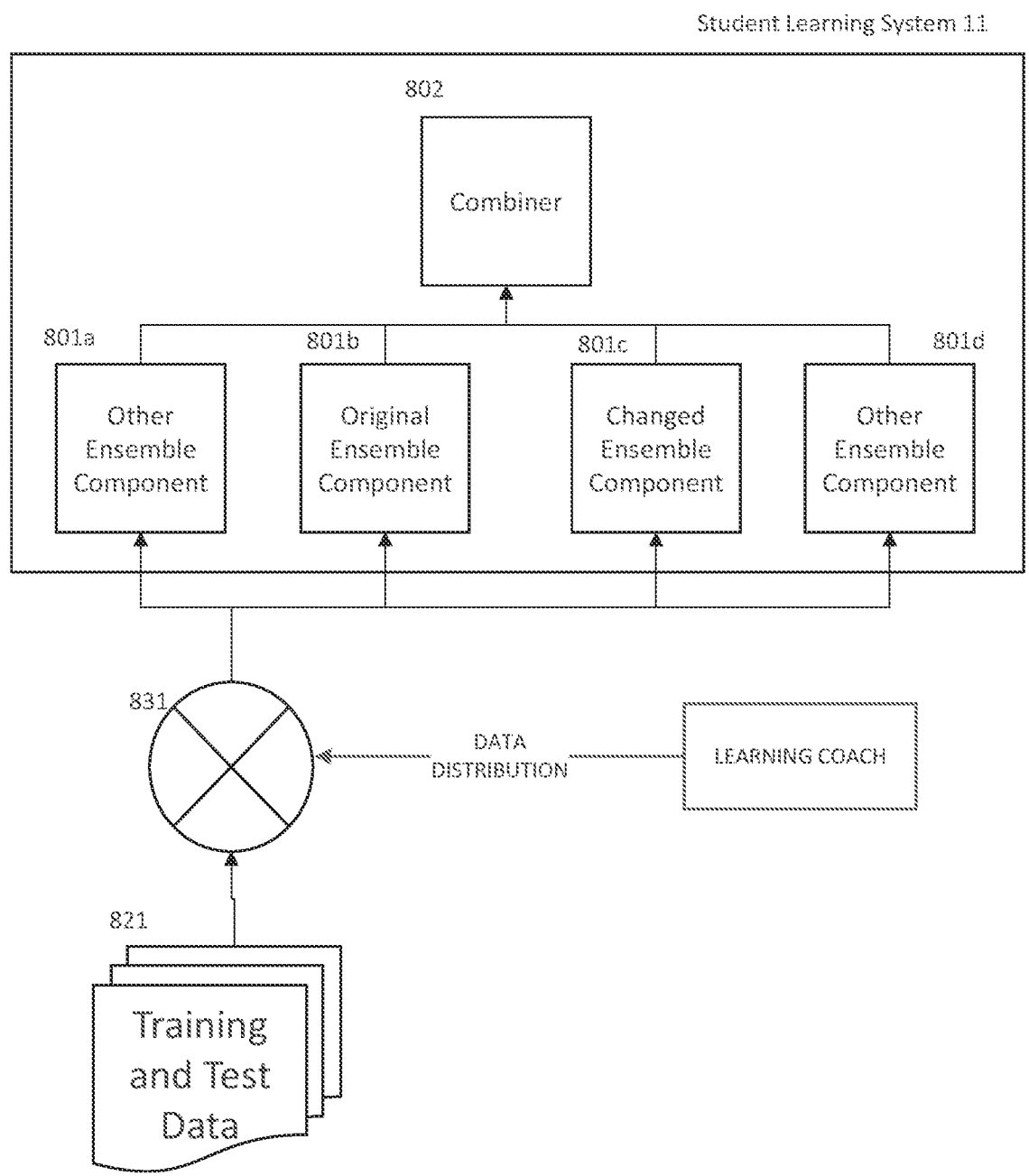
Figure 14:
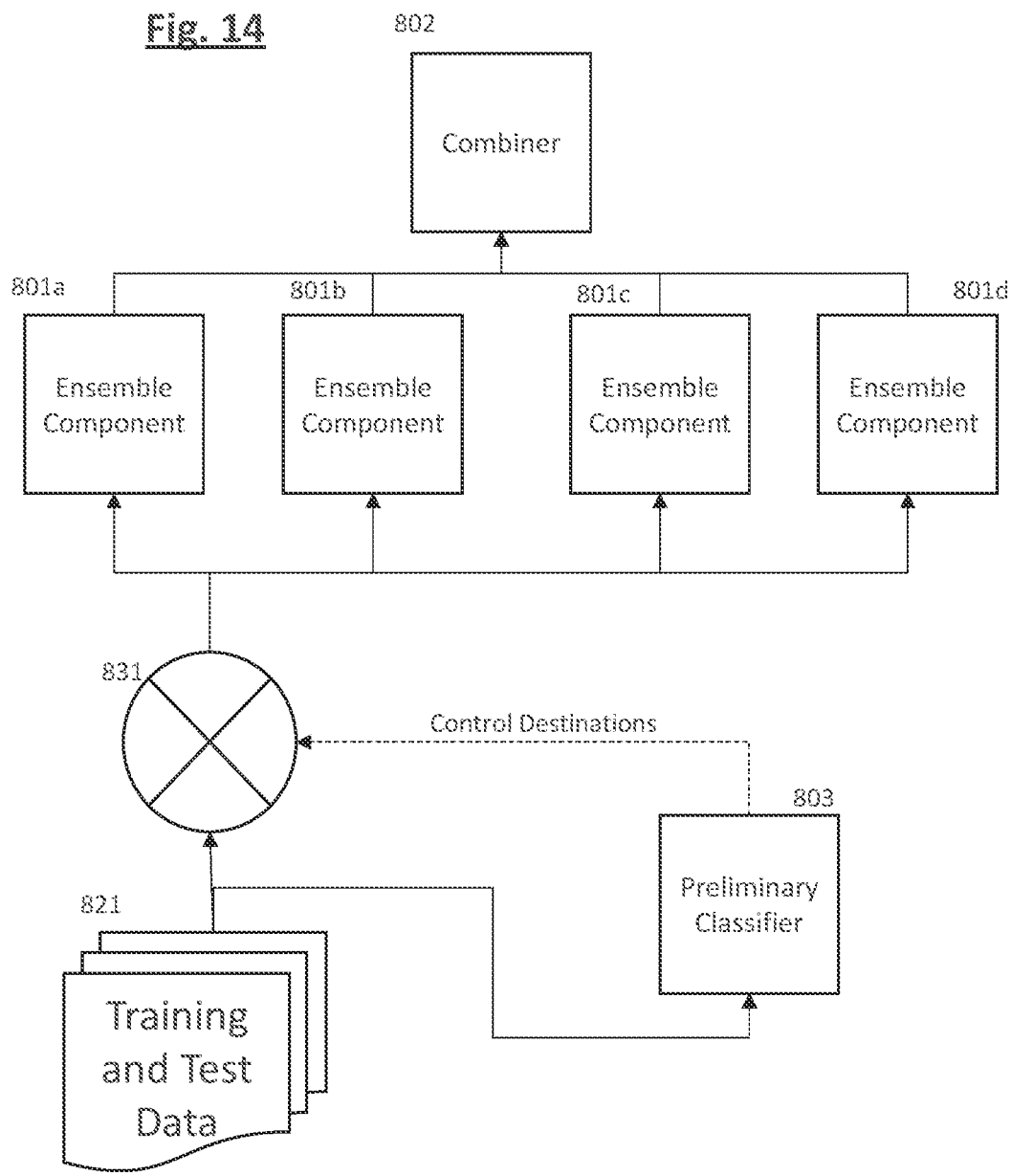
Figure 15:
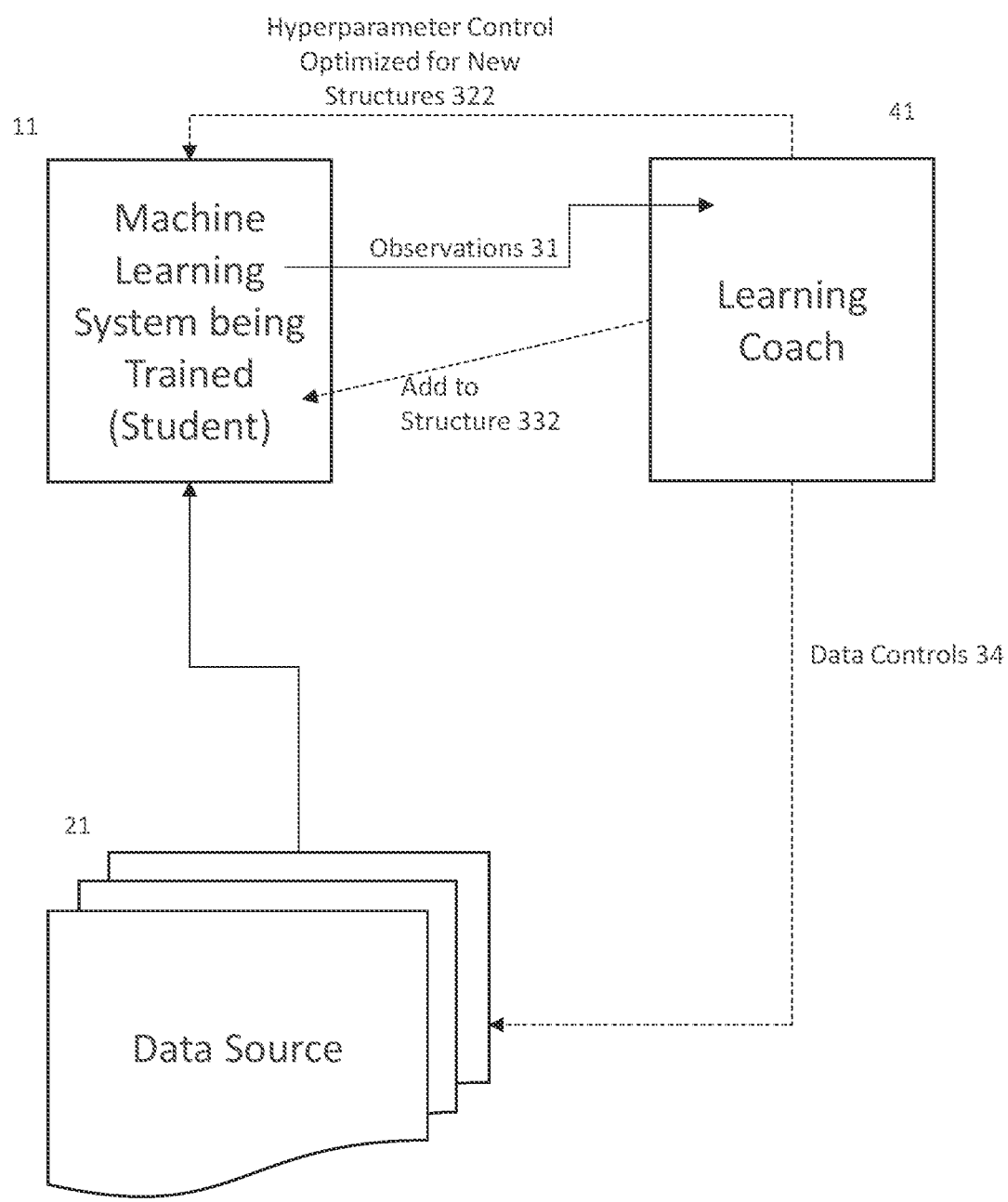
Figure 16:
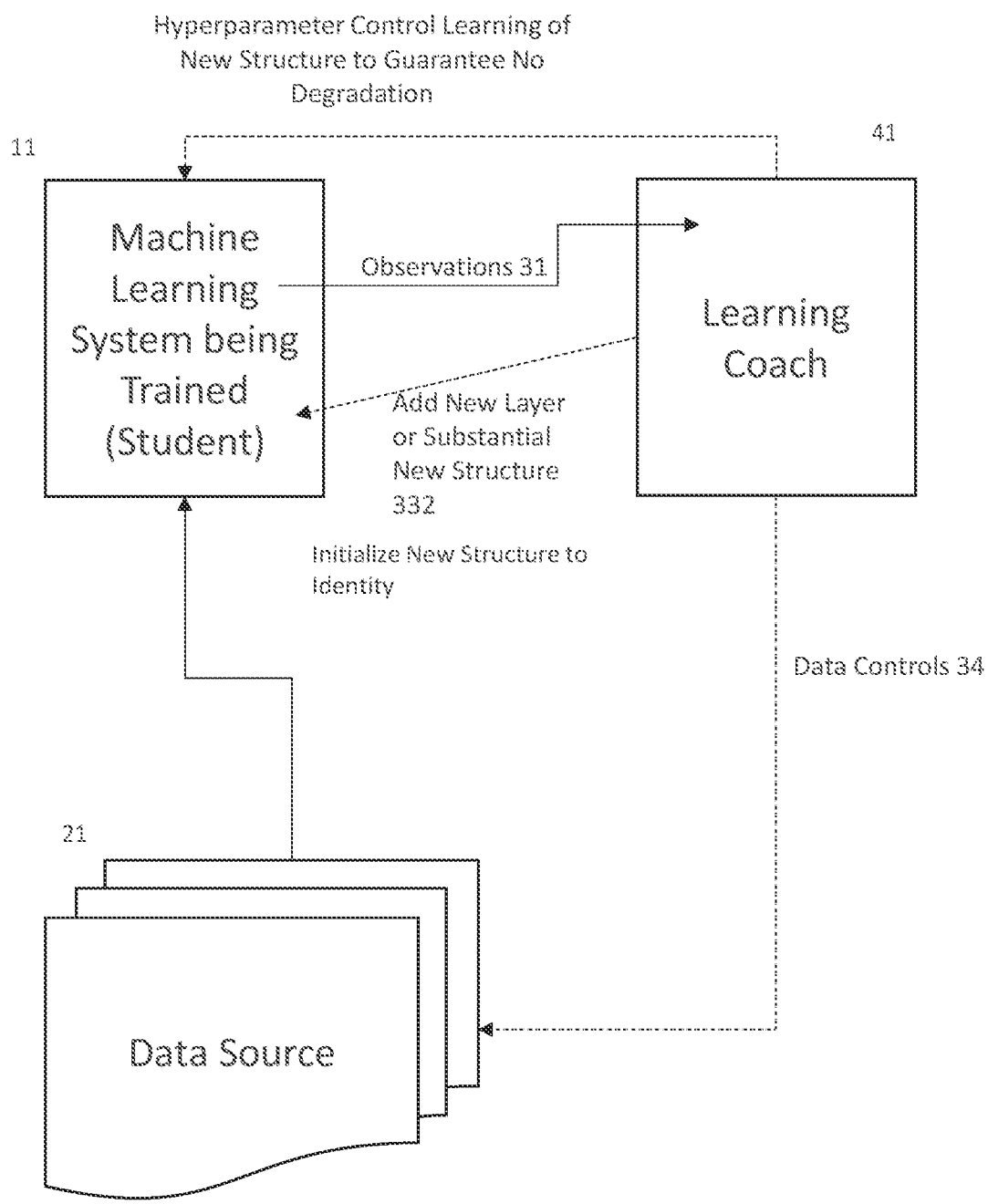

FIGS. 12A-D and 17 are diagrams that illustrate a system comprising the student machine learning system and the learning coach, as well as the reference system and the learning experimentation system;

FIG. 13 is a block diagram of an ensemble machine learning system where the learning coach controls the distribution of data among ensemble members according to various embodiments of the present invention;

FIG. 14 is a block diagram of an ensemble machine learning system where a preliminary classifier controls the distribution of data among ensemble members according to various embodiments of the present invention; and FIGS. 15 and 16 are block diagrams of systems that include a student machine learning system and a learning coach according to various embodiments of the present invention.

DESCRIPTION

Figure 1:
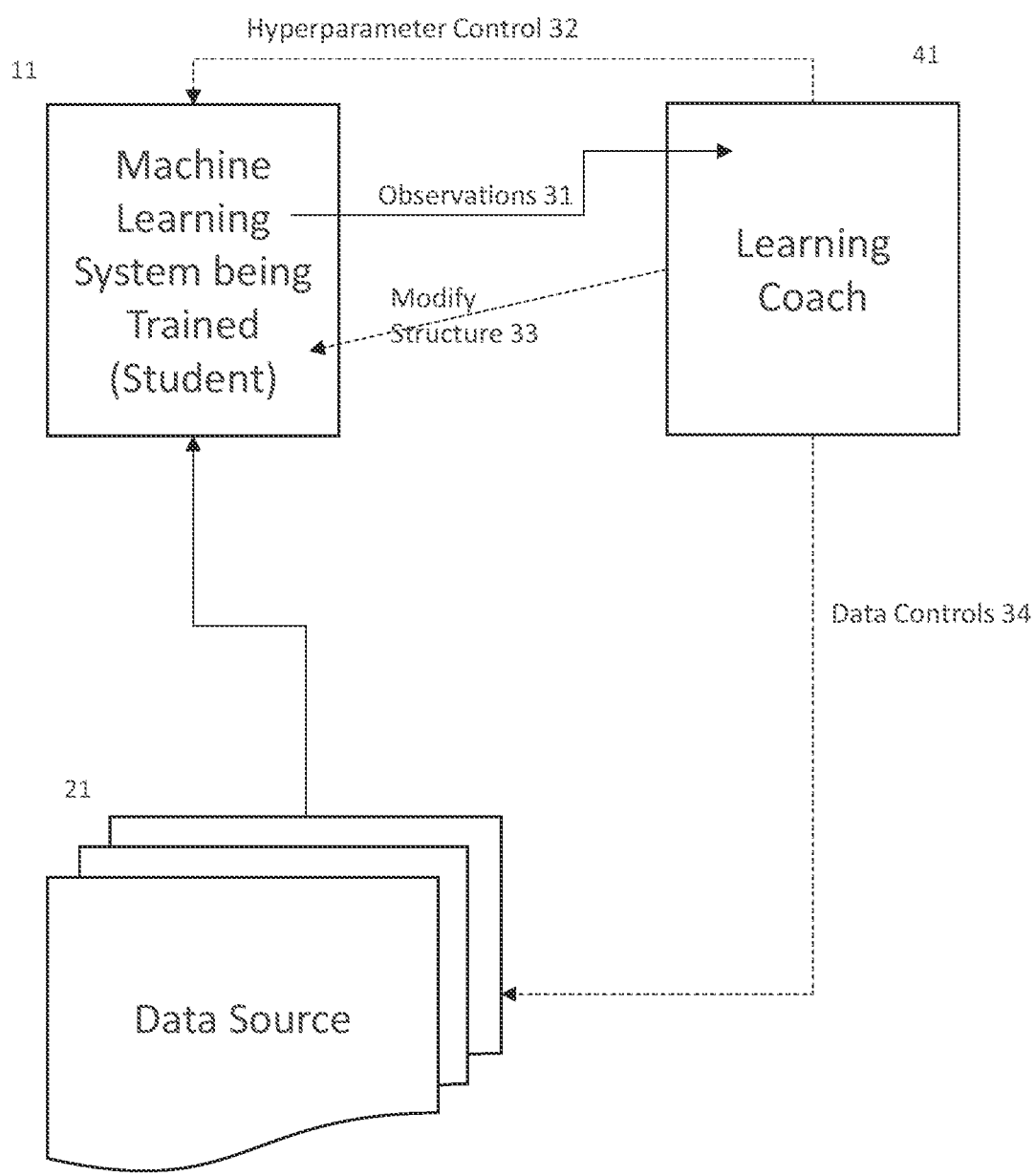
FIG. 1 is a block diagram of a system that include a student machine learning system and a learning coach according to various embodiments of the present invention.

FIG. 1 is a block diagram of a computer system 10 according to a basic embodiment of the present invention. FIG. 1 shows a machine learning system 11 that is being trained to recognize patterns in the data supplied from a data source 21. Since the machine learning system 11 is in the training or learning process, it is also referred to herein as a "student." The system 10 further includes a machine learning system 41 that controls some aspects of the learning process and aids the student machine learning system 11 in its process of learning the patterns. Because it helps that learning process, the machine learning system 41 is called a "learning coach." It can be, for example, a pattern recognition system that recognizes patterns of learning performance of a ML system, such as the student 11 or some other ML system.

In various embodiments, the learning coach 41 is itself a machine learning system. However, the learning coach 41 does not try to recognize the patterns that the student learning system 11 is learning to recognize. The primary data processed by the learning coach 41 are observations 31 of the internal state of the student machine learning system 11 and data that student system 11 computes during its training process. In addition, among the control mechanisms used by the learning coach 41 is the selection of training data for the student 11. Thus, the learning coach 41 may also receive the training data 34 as input, but not for the purpose of recognizing patterns in it, as described herein. The learning coach 41 preferably also has other means of controlling and aiding the learning process of the student 11, including controlling hyperparameters 32 of the student 11 and changing the internal structure 33 of the student machine learning system 11, as described herein.

For purpose of discussion, focus first on the controls called "hyperparameters." Generally, any large complex machine learning system, such as the student learning system 11, has a large number of parameters for which good values need to be found to try to minimize some measure of the cost of errors in the pattern recognition process. These are the trainable parameters. Finding these values is the essence of the process called "learning" in a machine learning system. There may be millions or even billions of these parameters, so the learning process may be very time-consuming and expensive. To help the learning process work better, there are usually a few control parameters that tune the learning process to work better on the kind of data for a particular task. These control parameters are not learned by the machine learning system 11, but usually are specified by the system designer. To distinguish them from the parameters being learned by system 11, these control parameters are referred to as "hyperparameters" herein; they are parameters that control the learning process of the machine learning system.

In embodiments of the present invention, some or all of these hyperparameters are not controlled by the system designer, but rather are controlled by the learning coach 41.

To illustrate the use of hyperparameters through an illustrative example, let the student system 11 be a large, deep feed-forward neural network (a DNN), a type of machine learning system that is well known to those skilled in the art of machine learning. A deep neural network is a network that has many layers of nodes representing artificial models of neurons with connections or arcs in the network representing the strength of the connection between the neurons represented by the nodes. Each arc is associated with a numerical value that represents the strength or "weight" of its connection. These weights comprise the parameters to be learned in the training of student system 11. In a large DNN, there may be millions of nodes with billions of connections and, therefore, billions of these connection weights that need to be learned. The individual nodes and arcs can use a greatly simplified, artificial model of a real neuron. The complexity of the learning process for deep neural networks arises from the large number of nodes and arcs and the complexity of their interactions.

For purpose of illustration, the use of the hyperparameters for training deep feed forward neural networks will be described. This example is by way of illustration and is not intended as limiting the scope of the invention, as the invention can be applied to any complex machine learning system, including support vector machines (SVMs), random forests, CART analysis, hidden stochastic process models, dynamic Bayesian networks, Boltzmann machines, ensembles of any of these and even heterogeneous ensembles. The machine learning system may be complex in any one or more of several ways. It may have a large, complex internal structure; its learning may be controlled by hyperparameters; or its training may be done by a computationally intensive process on a large amount of training data. The illustrative training method is an iterative process of stochastic gradient descent on a log-likelihood error cost function, with a softmax classification for the output nodes, the gradients for each training example being estimated by back propagation of the partial derivative of the error cost function, the estimates being accumulated over minibatches, with one update of the parameters for each minibatch. In the illustrative method, the training process is enhanced by Nesterov's momentum, and smoothed by L2 regularization. Other well-known training methods could be used in a similar way.

The pseudo-code for this well-known training process is as follows:

---

Initialize each weight;
Do until a stopping criterion is reached: {
1. Input a set (minibatch) of training examples
2. For each training example m, set $a_{0,i}(m)$ and perform the following steps:
   a. Feedforward (with softmax output): For each $l = 1, 2, \ldots, L-1$ compute
      $z_{l,j}(m) = \Sigma_{i=0}^{n_l} w_{l-1,i,j} a_{l-1,i}(m)$, $a_{l,j}(m) = \sigma(z_{l,j}(m))$, $a_{L,k} = e^{z_{L,k}}/\Sigma_j e^{z_{L,j}}$
   b. Compute output error gradient $\delta_{L,j}(m)$:
      $\delta_{L,j}(m) = -(y_j(m) - a_{L,j}(m))/n_L$
   c. Backpropagate error gradient:
      For each $l = L-1, L-2, \ldots, 2, 1$ compute
      $$\delta_{l-1,i}(m) = a_{l-1,i}(m)(1 - a_{l-1,i}(m)) \sum_{j=1}^{n_l} w_{l-1,i,j} \delta_{l,j}(m)$$
3. Gradient descent: For each $l = L-1, L-2, \ldots, 2, 1$ update the weights
   $\widetilde{v_{l,i,j}} = v_{l,i,j}$
   $v_{l,i,j} \leftarrow \mu v_{l,i,j} - \eta \Sigma_{m=1}^M a_{l,i}(m) \delta_{l+1,j}(m)/M$
   $w_{l,i,j} \leftarrow w_{l,i,j}\left(1 - \frac{\eta\lambda}{n}\right) - \mu\widetilde{v_{l,i,j}} + (1+\mu)v_{l,i,j}$

---

Each weight $w_{l,i,j}$ may be initialized as a random number drawn from the normal distribution $$N\left(\mu = 0, \sigma = \frac{1}{\sqrt{n_j}}\right),$$

where $w_{i,j}$ is the connection weight between node i in layer k−1 and node j in layer k, and $n_j$ is the number of connections into node $n_j$. There are L layers, counting the output layer. There are M examples in the minibatch. For each layer l<L, there is a dummy node 0 that always has the activation 1.0, so the weight $w_{l,0,j}$ acts like a bias for node j in layer l+1.

This method of training deep feed forward neural networks is known and successful. However, it is only one example of many variations. This invention applies to any of these variations in a manner like this illustrative example. In the prior art, M, $\eta$, $\lambda$, $\mu$, and other hyperparameters must be determined by experimentation. In embodiments of the present invention, learning coach 41 learns to optimize these hyperparameters from observation of the learning process of student learning system 11. Since these hyperparameters have numerical values, many as continuous variables, learning coach 41 may model the learning performance of student learning system 11 as a regression. Alternately, or in addition, learning coach 41 may directly estimate the optimum value of a hyperparameter as a regression function of observations that learning coach 41 has made during the current or previous steps of the training of student learning system 11. Learning coach 41 may learn categorical hyperparameters as a classification task.

Note that there are several hyperparameters that control the training, including for example M (the size of the minibatch), $\eta$ (the learning rate), $\lambda$ (the regularization parameter) and $\mu$ (the momentum parameter). Generally, the values of these parameters are set by trial-and-error, a very tedious process since each trial requires a test run of the full training procedure on a large amount of training data and then testing on a separate validation set. The process can be automated in the sense that an entire n-dimensional grid can be explored automatically, but that is even more computationally expensive.

Furthermore, in the illustrative example, each of these hyperparameters is a constant applied to all parameters in the network. That is, the same value is used for every weight in the network, which may have millions of nodes and billions of connections. Some improvement can be achieved by using any of several schemes that allow the learning rate hyperparameter, $\eta$, to be different for each weight. A technique called RMSprop is an illustrative example of one of these schemes.

In RMSprop, there is a different learning rate for each weight, depending on the size of its past partial derivatives. The justification is that, if a weight has had many large partial derivatives in the past, then it no longer needs to have a learning rate as high as other weights. However, RMSprop only adds one extra degree of control because the change depends on a single statistic. This one extra degree of control hardly begins to approach the problem of customizing the learning rate to all the different conditions of the weights being trained in various parts of the network at the various stages of the learning process. Of course, it would be impossible for a human to individually customize the learning schedule for each of up to over a billion parameters.

Figure 2:
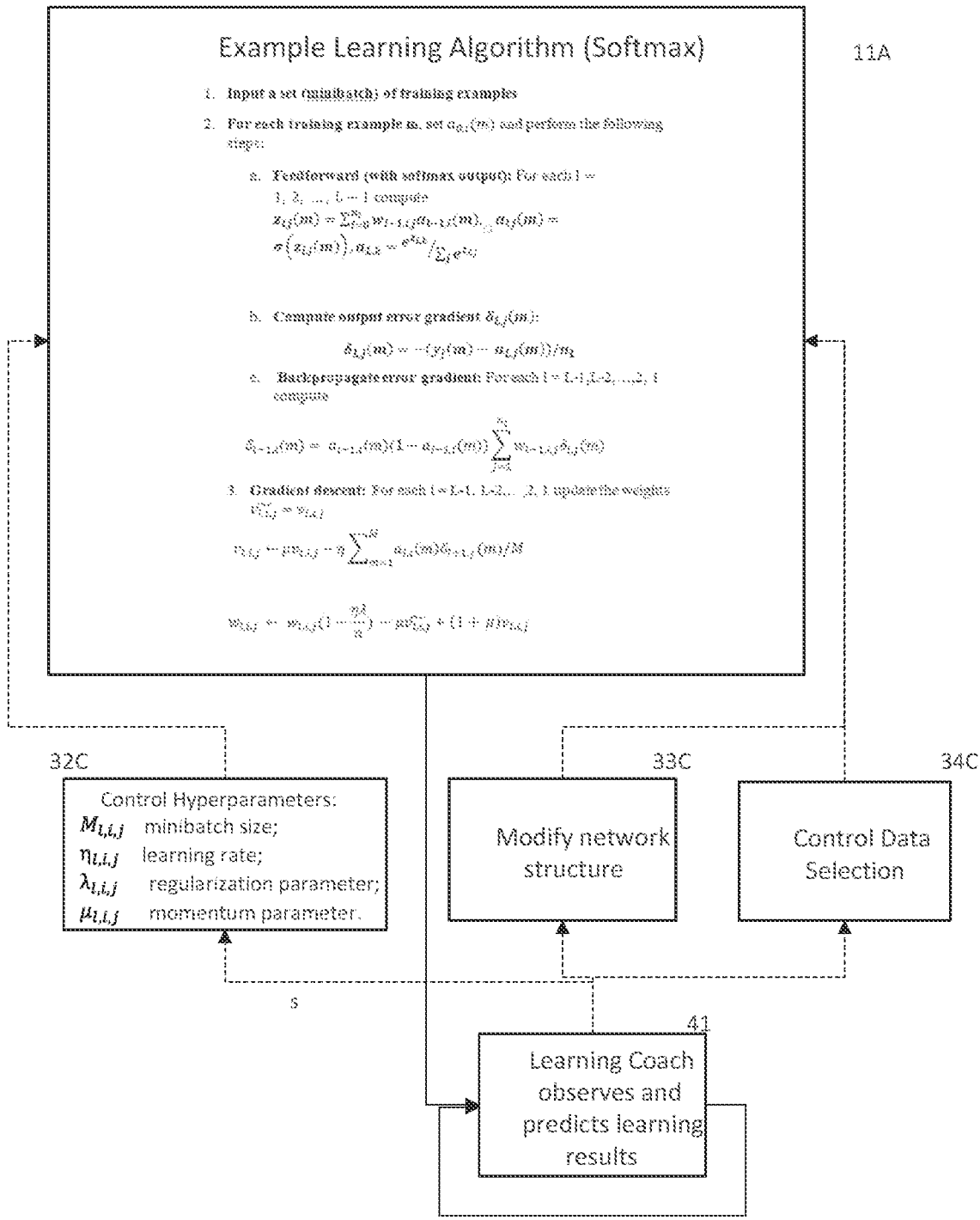
FIG. 2 is a block diagram of one process by which the learning coach controls the training of a student learning system according to various embodiments of the present invention.

However, in the illustrative embodiment of the invention, the learning coach 41 can customize the hyperparameters of the student learning system 11. In particular, FIG. 2 illustrates an embodiment of a process for the learning coach 41 to control various aspects of the student learning system 11. As shown in FIG. 2, the learning coach 41 can control hyperparameters of the student learning system 11 at block 32C; modify the structure of the student learning system 11 at block 33C as described herein; and/or control data selection for the student learning system 11 at block 34C as described herein. Block 11A in FIG. 2 provides an example learning algorithm for the student learning system 11. Each hyperparameter $\eta_{l,i,j}$, $\lambda_{l,i,j}$, $\mu_{l,i,j}$ in the algorithm has subscripts l,i,j. Even the minibatch size, M, can be customized to different value $M_{l,i,j}$ for each connection weight. This customization of M may be achieved by postponing the update for the weight to some multiple of the default value of M. Each connection weight can use a customized value of the multiple. Thus each weight, that is, each parameter being trained, can have a unique set of values for the hyperparameters.

Each hyperparameter is replaced by N customized hyperparameters controlled by learning coach 41, where N is the total number of weights (or other learned parameters). In a large neural network, N may be in the billions. The pseudo-code now becomes as shown in box 11A of FIG. 2:

---

Initialize each weight;
Do until a stopping criterion is reached: {
3. Input a set (minibatch) of training examples
4. For each training example m, set $a_{0,i}(m)$ and perform the following steps:

-continued a. Feedforward (with softmax output): For each $l = 1, 2, \ldots, L - 1$ compute
$z_{l,j}(m) = \Sigma_{i=0}^{n_l} w_{l-1,i,j} a_{l-1,j}(m)$, $a_{l,j}(m) = \sigma(z_{l,j}(m))$, $a_{L,k} = e^{z_{L,k}}/\Sigma_j e^{z_{L,j}}$ b. Compute output error gradient $\delta_{L,j}(m)$:
$\delta_{L,j}(m) = -(y_j(m) - a_{L,j}(m))/n_L$ c. Backpropagate error gradient:
For each $l = L - 1, L - 2, \ldots, 2, 1$ compute $$\delta_{l-1,i}(m) = a_{l-1,i}(m)(1 - a_{l-1,i}(m))\sum_{j=1}^{n_l} w_{l-1,i,j}\delta_{i,j}(m)$$

4. Gradient descent: For each $l = L - 1, L - 2, \ldots, 2, 1$ update the weights $\widetilde{v_{l,i,j}} = v_{l,i,j}$
$v_{l,i,j} \leftarrow \mu_{l,i,j,k} v_{l,i,j} - \eta_{l,i,j} \Sigma_{m=1}^M a_{l,i}(m) \delta_{l+1,j}(m)/M_{l,i,j}$
$w_{l,i,j} \leftarrow w_{l,i,j}\left(1 - \frac{\eta_{l,i,j}\lambda_{l,i,j}}{n}\right) - \mu_{l,i,j}\widetilde{v_{l,i,j}} + (1 + \mu_{l,i,j})v_{l,i,j}$ Similar customized hyperparameters may be controlled by learning coach 41 for other neural network training algorithms and for the training algorithms of other machine learning systems. Although this illustrative embodiment has been described with respect to a set of hyperparameters commonly used for training deep neural networks, it should be understood that the invention can apply the same process for the learning coach 41 to learn to estimate the best values for the hyperparameters for the training of any type of student machine learning system 11.

As a machine learning system, the learning coach 41 can learn to estimate the optimum value for each customized hyperparameter based on the observed values of variables related to a particular connection weight and its surrounding nodes. For each training example m in each minibatch k, it can observe the results of the forward activation of the deep neural network and the backpropagation of the partial derivatives. Note that it can observe these values for each example in the minibatch, not just summary statistics once for each update in the minibatch gradient descent.

Figure 3:
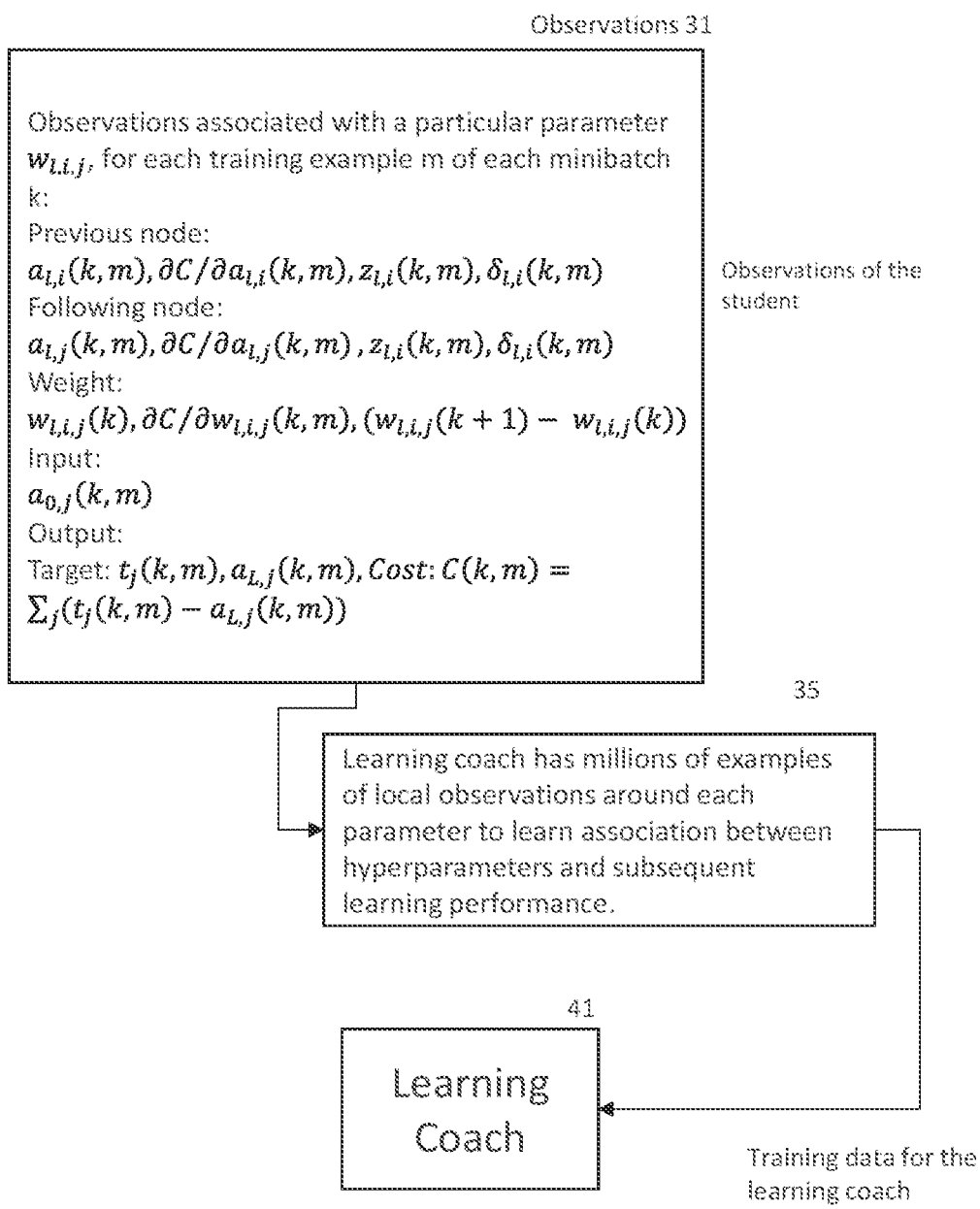
FIG. 3 is an illustration of a process according to various embodiments of the present invention by which the learning coach collects observations of the student learning system as the student learning system is being trained.

As illustrated in blocks 31 and 35 of FIG. 3, each update of each connection weight parameter gives the learning coach 41 an example of the effect of a set of hyperparameter values on the future learning performance of student learning system 11. Learning coach 41 models this effect as a function of the hyperparameters and of the context, that is, the set of observations surrounding the connection for each example in the preceding minibatch or multiple preceding minibatches. In other words, the learning coach has millions of training examples from which it can learn to predict the best hyperparameter values for each customized situation.

One aspect of embodiments of the present invention is that the learning coach 41 learns to recognize patterns in the observations of an individual weight parameter and patterns in nearby nodes and connections in the network. Learning coach 41 learns these patterns from observing the learning process of many different examples of student learning systems 11. That is, learning coach 41 learns from prior experience of coaching other student learning systems 11, not just from the current example.

As will be explained in more detail in reference to other figures, the learning coach 41 can apply a similar learning process to its ability to modify the structure of the student learning system 11, as in block 33C of FIG. 2 (e.g., adding or removing layers from the network in instances where the student learning system 11 uses a network) and its ability to control the selection of training data supplied to the student learning system, as in block 34C of FIG. 2.

Another general aspect of the invention according to various embodiments is that the learning coach 41 can make structural changes in student learning system 11, as shown by control line 33 in FIG. 1. For example, if student learning system 11 is a neural network, learning coach 41 can add or delete connections, nodes, or groups of nodes, even entire layers of nodes. When learning coach 41 makes a decision, such as a structural change, or estimates a discrete variable, rather than a continuous variable or hyperparameter, it can represent its task as a classification problem rather than as a regression. For example, if learning coach 41 is a neural network, it can use a softmax function on a set of output nodes rather than linear nodes.

When learning coach 41 makes structural changes to the student learning system 11, it affects not just the learning rate but also the minimum cost. It also affects the amount of computation required by student learning system 11. One aspect of the present invention according to various embodiments is that learning coach 41 can have an objective that is different from the objective of student learning system 11. For example, in evaluating structural changes, learning coach 41 may optimize some combination of cost of computation and some measure of the error rate of a given structure, whereas student learning system 11 just minimizes some measure of the cost of errors for a fixed structure.

In one illustrative embodiment, learning coach 41 trains itself to make decisions about structural changes in student learning system 11 by running experiments. In this illustrative embodiment, learning coach 41 implements two versions of student learning system 11, one with the structural change and one without. Learning coach trains both versions of student learning system 11 and evaluates their comparative performance on an independent evaluation set. It also measures or estimates the comparative computational requirements for the two versions. This trial-and-error experimentation, by which learning coach 41 learns to make decisions about structural changes in student learning system 11, is similar to the trial-and-error process of estimating customized hyperparameters illustrated in FIGS. 2 and 3.

The student learning system 11 and learning coach 41 can be implemented with computer hardware and software. For example, they could be part of an integrated computer system (e.g., a server or network of servers) that has multiple processing CPU cores. One set of cores could execute the program instructions for the student learning system 11, another set for the learning coach 41, and so on. The program instructions could be stored in computer memory that is accessible by the processing cores, such as RAM, ROM, processor registers or processor cache, for example. In other embodiments, the student learning system 11 and/or the learning coach 41 could execute on graphical processing unit (GPU) cores, e.g. a general-purpose GPU (GPGPU) pipeline. GPU cores operate in parallel and, hence, can typically process data more efficiently that a collection of CPU cores, but all the cores execute the same code at one time. Thus, if the student learning system 11 and/or the learning coach 41 were implemented with a GPGPU pipeline, the GPU cores would need to take turns executing the code for each system. In other embodiments, the student learning system 11 and/or the learning coach 41 could be part of a distributed computer system. For example, the computer devices (e.g., servers) that implement the student learning system 11 and learning coach 41 may be remote from each other and interconnected by data networks, such as a LAN, WAN, the Internet, etc., using suitable wired and/or wireless data communication links. Data may be shared between the various systems using suitable data links, such as data buses (preferably high-speed data buses) or network links (e.g., Ethernet).

Figure 4:
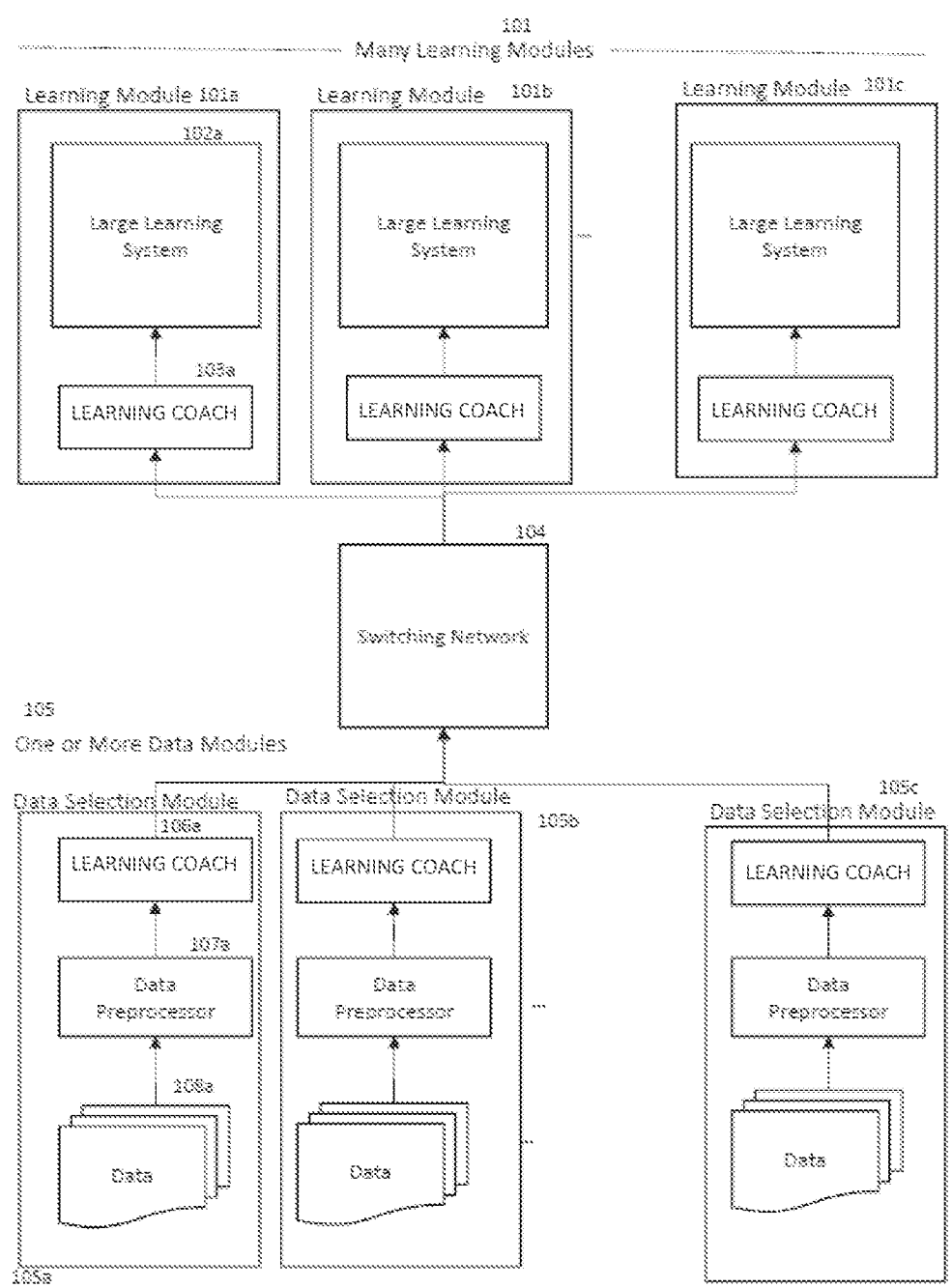
FIG. 4 is a block diagram of large learning system with data flow controlled by learning coaches according to various embodiments of the present invention.

FIG. 4 is a block diagram of an illustrative embodiment of the invention according to other embodiments. In this illustrative embodiment, there is a plurality of learning modules 101 and one or more data selection modules 105, all connected through a switching network 104. Each learning module comprises a large learning system 102 and a learning coach 103. The large learning system 102 and the learning coach are examples of the student learning system 11 and learning coach 41 described above. As such, each large learning module 101 may be a deep neural network with up to one hundred or more layers, millions of nodes, and billions of connections. The large learning systems 102 may be, for example, pattern classification systems, representing their output by selecting the best matching category or by computing a score for the degree of match for each category. Alternately, the large learning systems 102 may be regression type systems, representing their output as an approximation to some unknown function estimated from noisy samples. In one illustrative embodiment, under the guidance of the leaching coaches 103, each learning module 101 is trained to specialize, performing best on particular problems or on particular kinds of data.

Each data selection module 105 may comprise a source of data 108, a data preprocessor 107, and a learning coach 106 for the data preprocessor. A copy of each item or batch of data 108 is converted to a packet and is sent by the switching network 104 to one or more of the learning modules 101, or is discarded. In the illustrative embodiment, each data selection module 105 determines the destination of each of the copies of each packet of data 108. In one illustrative embodiment, the data preprocessor 107 is a pattern recognition system performing some classification task on the same data 108 that is to be sent to the learning modules. As such the data preprocessors 107 and the learning coaches 106 are examples of the student learning system 11 and the learning coach 41 described above. That is, the learning coach 106 can control the hyperparameters, structure or data flow of the data preprocessors 107 as described herein. In another illustrative example, the data preprocessor 107 determines the destination of the data packets 108 based on metadata. For example, in a speech recognition system, the data preprocessor 107 may determine the destination of a packet based on the known or estimated identity of the speaker.

As described herein, the learning coaches 103, 106 in FIG. 4 can, among other things, change the architecture of an associated machine learning system 102, 107 by, for example, adding or deleting nodes in a network. It may control the learning process of the learning systems 102, 107 by, for example adjusting the step size in a stochastic gradient descent algorithm, or the size of a batch for batch update. The learning coaches 103, 106 may also impose a regularization or change the weight in a regularization of their associated student learning system 102, 107. When there is more than one associated machine learning system, one or more learning coaches 103, 106 may supervise and control the combining of knowledge of the machine learning systems or may combine the output for a particular data item. The learning coaches 103, 106 may even change the number of conventional machine learning systems working together on a task, for example, by cloning one or more existing systems and then training them differently, or alternately by combining two or more systems into a single system. These actions by a learning coach may be optimized by testing and evaluating the choices available to the learning coach based on practice data, as described in the following US patents, which are incorporated herein by reference in their entirety: U.S. Pat. Nos. 8,014,591; 8,180,147; 8,331,656; and 8,331,657.

In an embodiment in which the data preprocessor 107 is a pattern recognition system, the data preprocessor 107 may be similar to the large learning systems 102 in the learning modules 101 or it may be completely different. In particular, in some embodiments it may be much smaller and simpler than the large learning systems 102. It may also take a completely different form. For example, the large learning systems 102 may be deep neural networks, while the data preprocessors 107 may be hidden Markov process models, random forests, or simple k-means classifiers. In some embodiments, either the large learning systems 102 or the data preprocessors 107 may comprise a mixture of multiple types of pattern recognition systems.

Two or more large learning systems 102 may be combined into a single, larger learning system (which may be operating as a large learning system 102 in a larger overall system). The recent success of large deep neural networks has shown that, in applications with a very large amount of data, the larger the neural network the better the performance, up to some limit that depends on the amount of data. However, in many applications there is a practical limitation on the size of a neural network that can be implemented efficiently. There are several ways to implement the algorithms for deep neural networks and their training to run in parallel on many processor cores. It is especially cost effective to implement them to run on graphics processing units (GPUs) with thousands of processing cores on a single chip. With such a large number of processing cores on a single chip, the limiting factor on the size of a neural network implemented on a plurality of GPU boards is usually the data communication bandwidth between the GPU boards.

In the illustrative embodiment in FIG. 4, each large learning module 101 may contain one or more deep neural networks, or other learning systems, that are implemented on a single GPU board, or on a cluster of GPU boards that are connected by a very high speed data communication channel. In this illustrative embodiment, the data communication bandwidth between the modules is assumed to be substantially slower than the internal communication bandwidth among components within a module.

Moreover, in the illustrative embodiment in FIG. 4, like the embodiment shown in FIG. 1, each large learning system 102 can be trained in a specialized task, under the control and guidance of its learning coach 103. In addition, the task for a specialized module 101 may be so specialized that it only applies to a small fraction of the data, so a particular specialized module might only be active a small fraction of the time. One illustrative embodiment of a plurality of modules implemented on a single computer or a single local area network, which is shown in the exemplary embodiment of FIG. 5, would be to have most of the large learning systems 102 in an idle mode, perhaps just stored on secondary storage (e.g., not directly accessible by the CPU, typically implemented with hard disk drives, optical storage device and/or flash memory) with a smaller number of modules active or in a ready state in a cache in high speed memory (e.g., memory directly accessible by the CPU, such as main memory RAM, processor registers and/or processor cache). Specific examples of this embodiment will be discussed in the examples below.

As an illustrative example of an application for such a hierarchy of active and idle modules, consider a system for monitoring and guiding fitness exercises. With instrumented exercise machines, the system would know the exercise being performed by a particular individual, the muscle groups involved, the weight being moved, the number of sets to be performed, the number of repetitions per set, the range of motion, the rate of motion, the current point in the range, the steadiness of movement, and the entire past history of the individual. In some embodiments, the learning system might also have a model for many hidden or latent variables, perhaps even a detailed model of cell physiology, neuro-muscular activation, and the cardio-pulmonary system. The system could recognize and track the state of each client as a function of time throughout the exercise period. It could provide this information to a personal trainer, or could directly provide advice and encouragement to the client doing the exercise.

In this exercise and fitness monitoring example, there might be an individually customized learning module 101 for each client. In the illustrative example, there might be a computer system in each gym or fitness center. However, only a small fraction of the users of any particular fitness center would be using it at any one time. The data for the learning module for a specific user could be in secondary storage when the user is not at the center.

Moreover, the system could be implemented across numerous geographically-different fitness centers (tens, hundreds or thousands of fitness centers) that are connected over the internet. The total network-wide system would collectively learn the optimum fitness regimens. In this example, a fitness regimen would specify the types of exercise, the number of sets and repetitions, and the progression of increasing weight as a client exercises over a period of weeks or more. To learn the optimum regimens, the system would learn from the performance progression for a large number of clients with varying regimens across the numerous fitness centers.

Every person is different from each other person. Each person differs from one exercise session to another. Therefore, there could be a customized learning system (e.g., learning system 102a in FIG. 4) for each client. However, to learn optimum regimens, data needs to be combined from a large number of clients with similar characteristics and similar needs. In the illustrative embodiment, the data selection modules 105 could perform pattern recognition on the clients to group them together into groups who will be modeled together and who will receive similar recommendations for training regimens. Active athletes could be treated differently from cardiac rehab patients, etc. Each person could also be treated differently at different stages in their program as they become more fit. Thus, there is a need to customize to each individual, but also a need to identify particular groups and learn shared properties of the members of each group. Finally, there could also be large learning systems 102 that try to learn universals that apply to all people. The data selection modules 105 could send data for a particular person to the learning coach system 103 customized to that individual and also to the fitness regimen learning module for the group of users that is similar to the individual, and also to the modules learning knowledge that should apply to any user.

In an illustrative embodiment of the hardware systems supporting this personalized fitness system, there might be a dedicated computer with a GPU board in each gym or fitness center, and one or more data centers for the modules learning the network-wide knowledge, such as optimum regimens and long-term fitness strategies. In a single fitness center, the individually customized learning modules could be in secondary storage, except for the clients who are actually in the fitness center, whose learning modules would be in high-speed memory.

As a further illustrative example, consider handwriting recognition. There are two very different kinds of handwriting data: optical images of handwriting previously produced; and handwriting on a tablet or other device that measures position as a function of time and that can also produce a plot similar to an optical image of the writing. For the illustrative example, assume that the system is to recognize handwriting as it is being produced on a tablet. Because this mode also produces the equivalent of an optical image, the training can be bootstrapped from optical handwriting recognition data. If the handwriting to be recognized is produced on a tablet or smart phone, it is natural that the recognition be optimized to recognize the handwriting of the owner of the mobile device. However, it will also be desirable for the device to recognize the handwriting when the owner has someone else write something on the device.

In one such embodiment, a recognition app might be running on hundreds of millions of devices (e.g., tablets), with a separate customized recognition module on each device and many, less customized, modules running in data centers. Since each individual's handwriting is unique, there is the same need for customized, semi-customized, and universal learning systems as in the fitness center example.

In another embodiment of the handwriting recognition, each learning module 101 can be specialized in a completely different way. In this embodiment, each data preprocessor 107 can try to recognize each written word, the same as the large learning systems 102. However, in this illustrative embodiment, the objective of each data preprocessor 107 is not necessarily to get the correct answer as the first choice, but rather to always include it in a short list of high scoring answers. This short list of answers is then used by the learning coach 106 to direct the data for this particular recognition task to a learning module 101 that specializes in discriminating among the items in this short list. The learning coaches 103 could also group together the different short lists in various ways. For example, all short lists with the same top choice may be grouped together, resulting in one group for each word in the vocabulary. In another example, for each word in the vocabulary, there may be a different group for each pair of possible words that occur in the short list. In that example, there would be different embodiments depending on the number of copies made for each data item. In one embodiment, the group would depend on only the top N scoring word choices (e.g., N=2) and the only copy of the data would be sent to the learning module for that group of N words. In another embodiment, there could be a separate copy of the data item sent to a specialized learning module specializing in each of the pairs of words that occur on the short list. Thus, among these embodiments, the number of learning modules will range in size from the size of the vocabulary, which may be 100,000 words or more, up to 100 times the vocabulary size or more.

The learning coaches 103 for the learning modules 101 may combine groups of learning modules 101 to create a smaller set of groups. In some embodiments, however, they may have more than one physical module assigned to the same specialized task. Such an embodiment might be used, for example, if the learning modules 101 were running on a cooperative network of end-user systems. Then, even if many of the physical systems are offline at a particular time, there would usually be one or more backup systems that could do the same specialized task.

Figure 5:
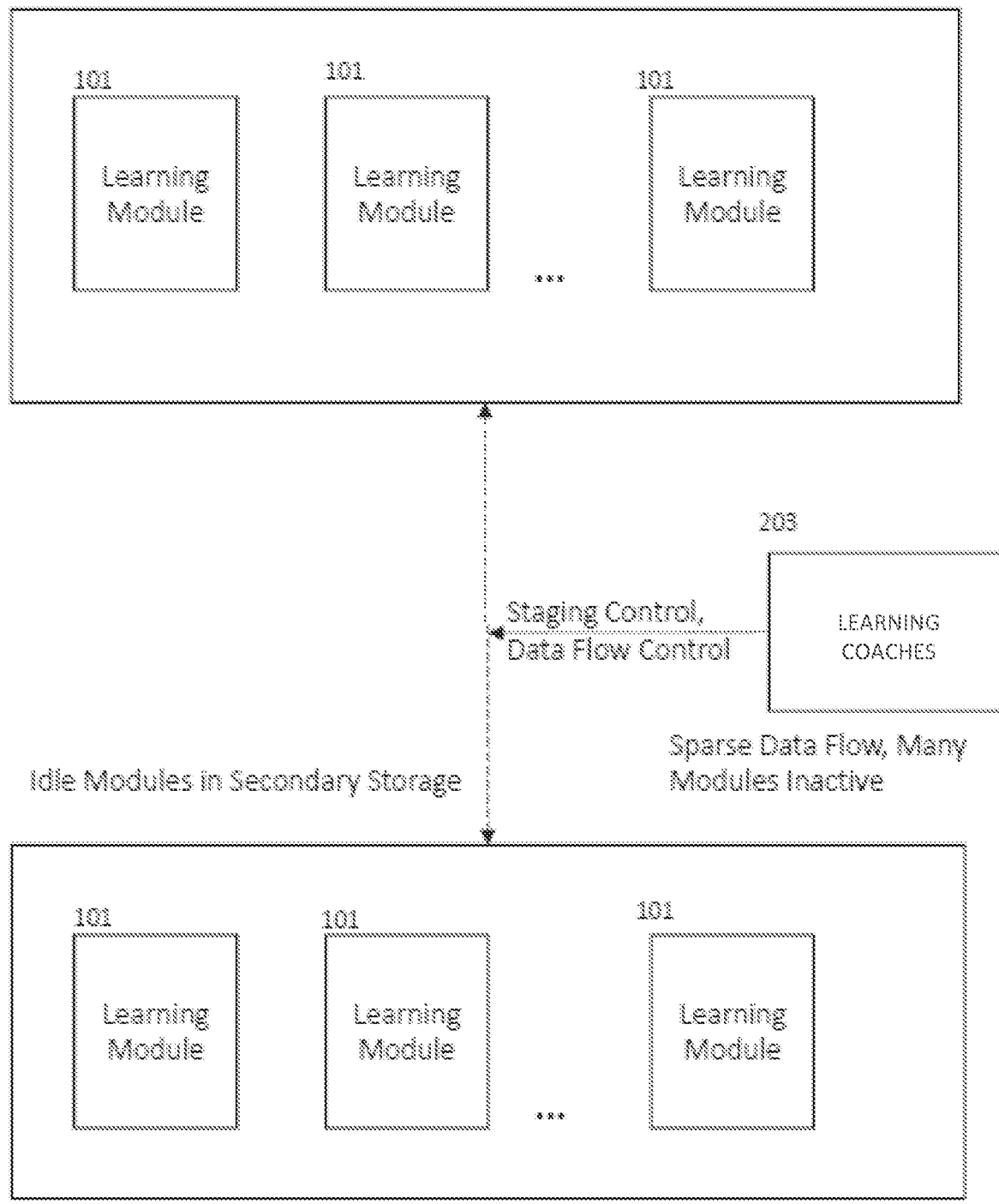
FIG. 5 is a block diagram of the system of FIG. 4 where some of the learning modules are stored in high-speed memory or cache and others are stored in secondary storage according to various embodiments of the present invention.

These word-specific embodiments with 100,000 to 10,000,000 modules also illustrate another aspect of embodiments of the invention. Not all words are equally likely, and for any particular word only a few other words have a high probability of being confused with the particular word. Therefore, in these embodiments, some of the word-specific learning modules will only infrequently receive data from the data selection process. During training, these less frequently used modules can be kept in secondary storage and only be loaded into high speech memory when enough data specific to a particular module has been assembled to complete a batch update in a stochastic gradient descent, as illustrated in FIG. 5. Stochastic gradient descent with batch update is a common method for training deep neural networks and is well known to those skilled in the art of deep neural networks. In this embodiment, the total size of the models in secondary storage can be several orders of magnitude larger than the size of high speed memory.

If recognition is done offline rather than in real time, the recognition computations can be sorted into batches by the switching network 104 and the staging of modules from secondary storage to high speed memory by the learning coaches 203 can be organized so that the necessary modules 101 are active for each batch of recognition computations. In many applications, the amount of computation needed for recognition is much less than for training because the training data must be presented many times to reach convergence in stochastic gradient descent training algorithms such as are used for training deep neural networks. Thus, fewer computations are needed for real time recognition than are needed for efficient training on large training sets. Thus, in some embodiments that need real-time recognition, the recognition may be implemented on different hardware, such as clusters of CPUs with very large RAM, rather than on GPUs. Such a CPU cluster can also have a large amount of secondary storage. Since a CPU cluster is much slower than a cluster of GPU boards, and since the CPU cluster typically has very large RAM as a cache, the occasional loading of some modules from the secondary storage will be better able to keep up with this implementation of real-time recognition.

Another example of the embodiment illustrated in FIGS. 4 and 5 is automatic speech recognition. Since every voice is different, automatic speech recognition modules 101 could be specialized to individual voices, as with the personal fitness systems or with the handwriting recognition. As another example, some of the modules 101 could be specialized to each word in the vocabulary or to short lists of high scoring words. This embodiment would be similar to the word-specific specialized modules discussed above for handwriting recognition.

As an additional example, speech recognition could be organized around the sequences of sounds and how the sounds vary as a function of context. The pronunciation of each sound is heavily influenced by the preceding and following sounds. One embodiment of the invention for speech recognition based on sound sequences would be to have a specialized learning module 101 for the middle sound in each possible sequence of three sounds. In this embodiment, the sound sequence would be recognized by the data preprocessors 107 and the data for the middle sound would be routed by the data selection learning coaches 106 and the switching network 104 to the learning module 101 that specializes in the sound triple that has been recognized by the data preprocessor 107. The large learning system 102 in the designated learning module 101 does not merely rescore the putative sound sequence, but performs a new recognition from scratch. During training it receives data for every instance in which the data preprocessors 107 recognize its particular sound triple, so it learns not only the characteristics of that sound sequence, but also of every sound sequence that the preprocessors 107 misrecognize as that sequence. Note that this embodiment specializes based on the sound triple as recognized, not the sound triple as hypothesized by the large learning system 101. This embodiment is in contrast to the triphone models that are well known to those skilled in the art of speech recognition using a beam search with a hidden Markov process model. The triphone models in such a beam search are specific to the triple of sounds hypothesized on a particular path in the beam, not on a triple of sounds as recognized by a data preprocessor 107. This difference forces the training of a specialized module 101 to compensate for the errors made by the preprocessor, adding robustness. Moreover, at recognition time, there is much less computation because the learning coaches 106 direct each data packet to only one or a small number of learning modules 101.

In one embodiment of the sound sequence methodology, the unit of sound could be a phoneme, which has been a common sound unit for large vocabulary speech recognition systems. However, the concept of "phoneme" is a linguistic abstraction, grouping together different sounds that are not distinguished by the speakers of a particular language even if those sounds might be distinguished in some other language. In another embodiment of the invention, however, the unit of sound would be the allophone, a narrower, more precise transcription of the actual sound as spoken. This embodiment would make it easier to share knowledge about the sounds from one language to another. It would fit well with the embodiment in which the learning modules 101 would specialize on triples of sounds as recognized by the data preprocessors 107 rather than as hypothesized by a higher level search. In particular, many of the data preprocessors 107 and specialized learning modules could be shared across languages. Some languages might have some extra allophones and some allophones that do not occur, but many of the allophones and their sequences could be shared. If two languages have some differences in their phoneme sets, those differences could be reflected in how the results from specialized allophone-based large learning modules 102 are combined for decisions at the phoneme or word level.

Another aspect according to some embodiments can be illustrated by the example of speech recognition, interpolation of specialization along a continuum. Let module A and module B be two specialized modules 101, with the training set $T_A$ for module A and training set $T_B$ for module B. For example, module A and module B may be specialized to each of two different speakers, or they may be specialized to two different languages or two different dialects. Then a new specialized module (A, B, γ) may be formed anywhere along a continuum between A and B by using a random selection of training data from sets $T_A$ and $T_B$, where the probability of choosing an item of data from set $T_A$ is (1−γ) and the probability of choosing an item of data from set $T_B$ is γ.

A large number of interpolations along the continuum from A to B may be trained and stored on secondary storage as illustrated in FIG. 5. Another aspect of this embodiment is especially apparent if the modules A and B have identical network architectures and they are specialized to two similar speakers, two similar languages, or are otherwise similar to each other. For example, two similar languages will differ in only a few phonemes; two similar speakers will agree on the pronunciation of most words, and so forth. The mappings of the phoneme set or the allophone set and their associated acoustic features will mostly vary continuously along the continuum of interpolated modules. When two interpolated modules along the continuum have only a small difference, then regularization may be applied in their training to make the training more resistant to overfitting and to make the models vary more smoothly along the continuum.

However, there must be a few discontinuities if one of these similar but distinct discrete sets is different in module B than in module A. Null hypothesis testing (as described in U.S. Pat. No. 8,014,591) by the learning coaches 103 for module A and module B can determine where along the continuum is the best place to break the regularization and allow the models on the two sides of the break to be different. Thus, with the guidance of the learning coaches, the system will be able to learn explicit structural knowledge as well as the usual parametric knowledge.

Figure 6:
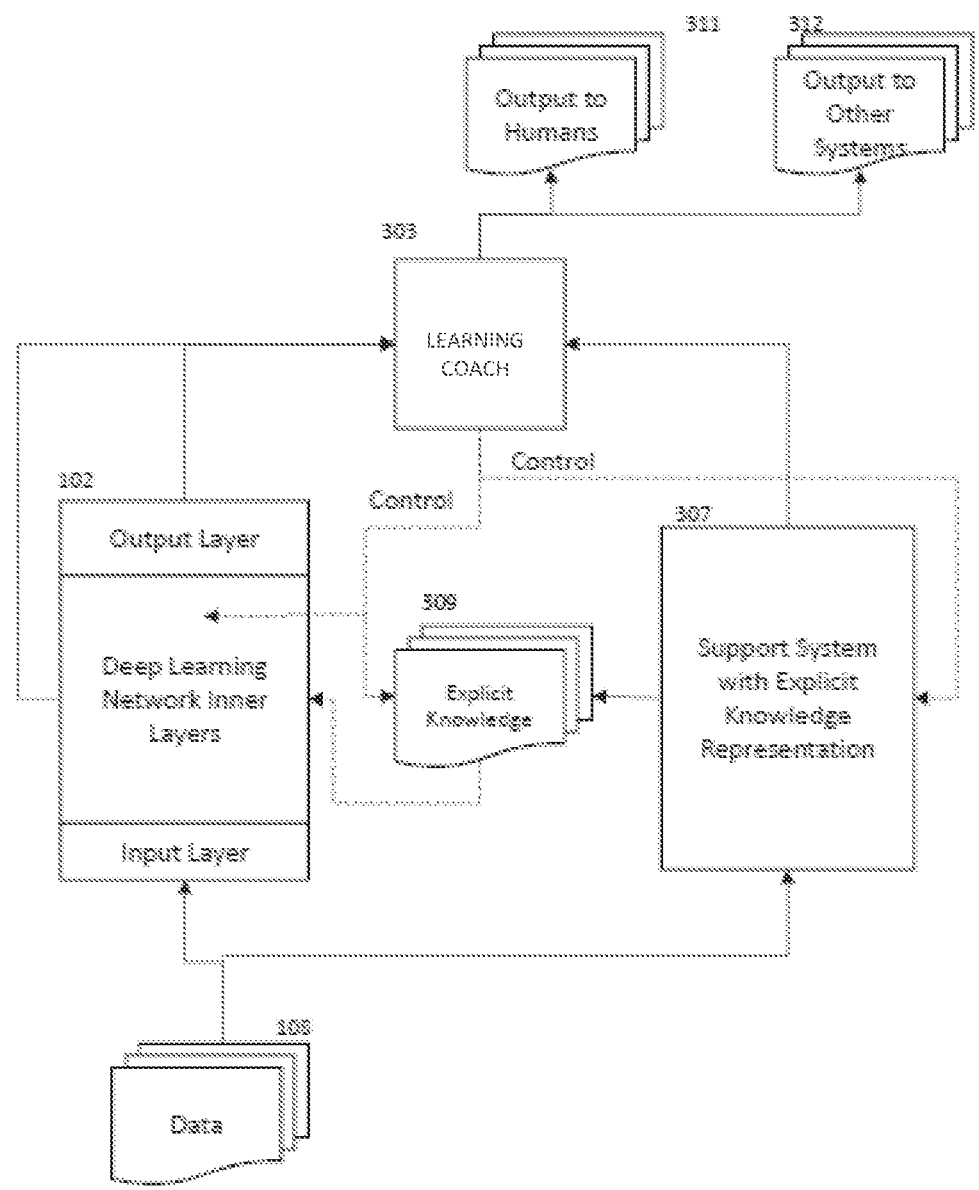
FIG. 6 illustrates a process for transferring explicit knowledge to a machine learning network according to various embodiments of the present invention.

FIG. 6 is a block diagram of another illustrative embodiment. In this embodiment, the learning coaches 303 enable the deep learning systems 102 to represent and learn knowledge in an explicit form that can be interpreted by humans and by other systems. In large learning systems, such as deep neural networks with many layers or even stochastic models with many interdependent latent or hidden variables, the knowledge acquired during learning is often represented in the interactions among the many elements in the system. In that case the knowledge is difficult or impossible to interpret and is inaccessible not only to human users but also to other computer systems. These other computer systems may be other learning modules cooperating on the same task or they may be systems controlling stationary or mobile equipment.

One attribute that is different in the embodiment illustrated in FIG. 6 from the embodiment illustrated in FIG. 4 is that the embodiment in FIG. 6 applies even when there is only one large learning system 102. Another element that is different in the embodiment illustrated in FIG. 4 is the support system 307 with explicit representation of knowledge, rather than the data preprocessor 107 shown in FIG. 4.

An important property of explicit knowledge is that it can be more readily communicated than implicit knowledge. It is more interpretable by humans and can more easily be transferred from one learning module 101 to another, or from a learning module to another computer application such as a control system.

FIG. 6 is a block diagram of an illustrative embodiment in which a learning coach 303 extracts explicit knowledge from the support system 307 and introduces the explicit knowledge into the inner layers of a deep learning network 102 by any of several means, as well as optionally presenting it to humans 311 and sharing it with other systems 312. In the illustrative embodiment, the learning coach 303 presents the knowledge to the deep learning network 102 in one of two forms. One form in which the learning coach 303 can present knowledge is as a set of nodes and activation levels for those nodes associated with a particular set of data input values. In some embodiments, particularly if the support system 307 is also a deep learning network, the learning coach 303 may present knowledge to the learning network 102 in the form of connection weights between particular nodes. The methods that the learning coach 303 uses to associate particular nodes in the presented knowledge with particular nodes in the inner layers of the deep learning network will be discussed in association with other figures.

Figure 7:
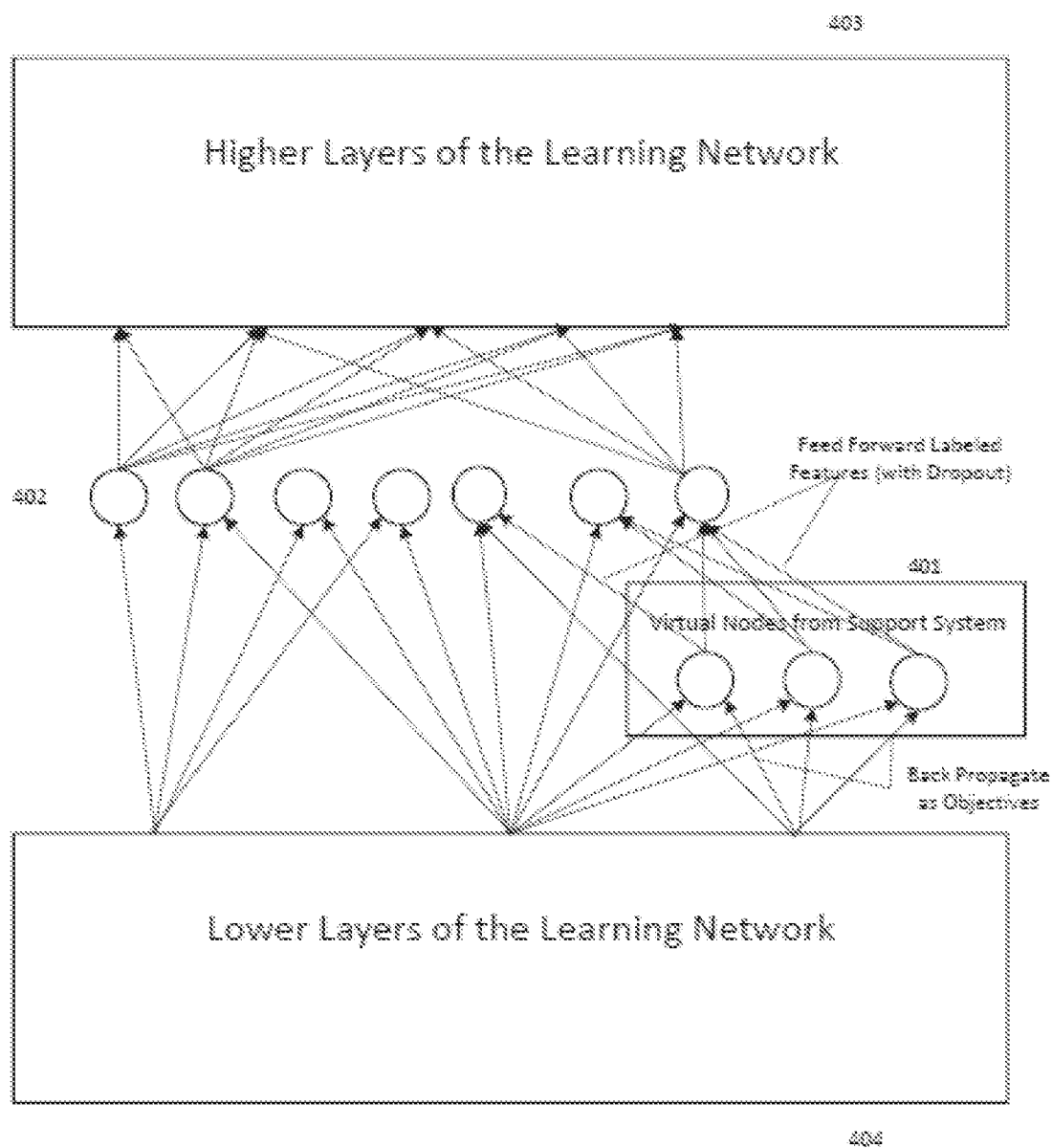
FIGS. 7 and 8 illustrate mechanisms for adding nodes to a learning network according to various embodiments of the present invention.

FIG. 7 illustrates one embodiment by which a learning coach 303 may inject explicit knowledge into an inner layer of a deep neural network 102 (see FIG. 6). This illustrative example assumes that the explicit knowledge is represented in the form of activation values for a specified set of external nodes. The nodes may either be a set of nodes within the support system 307 shown in FIG. 6 as selected by the learning coach 303 or a set of nodes within the learning coach 303 that represent knowledge extracted from the support system 307. The node activations may depend on the data input to the deep learning network 102 and may also depend on external data that is not available to the deep learning network 102.

The learning coach can select a particular inner layer 402 of the deep learning network as the layer to receive the injected knowledge. The layer 402 may have thousands of nodes and there may be many more connections than the few that are shown. The learning coach can make a virtual copy 401 of the specified set of external nodes and connect the virtual nodes to the selected layer 402 and to the lower layers 404. The nodes in the selected layer 402 receive input from the virtual nodes 401, but do not back propagate to the virtual nodes 401 during training. The virtual nodes 401 can back propagate through the connections to the nodes in the lower layers 404, but their activations can be controlled directly by the learning coach, so they do not receive input from the lower layers.

In some embodiments, the learning coach 303 can control the dropout rate for the virtual copied nodes. Dropout is a well-known technique in training deep neural networks. It consists of performing training steps in which certain nodes are forced to have a neutral value or to be unobserved, regardless of what their activation levels may be for the current data being processed. Dropout generally trains a deep neural network to be more robust because training in the presence of dropout forces the neural network to learn to estimate the missing data using other paths through the network. In the embodiment illustrated in FIGS. 6 and 7, the objective of the learning coach 303 can be to coach the deep learning network 102 to learn the explicit knowledge. In some embodiments, the total system is designed to have the external support as a permanent addition to the deep learning network. In other embodiments, the system is designed for the deep learning network 102 to learn to estimate the explicit knowledge for itself and to eventually be disconnected from the support system 307. In either case, the learning coach 303 preferably monitors the performance of the network 102 towards the specified objective. The learning coach can then optimize the dropout rate and other control parameters based on null hypothesis testing on practice data, as described in U.S. Pat. No. 8,014,591, which is incorporated herein by reference in its entirety.

Figure 8:
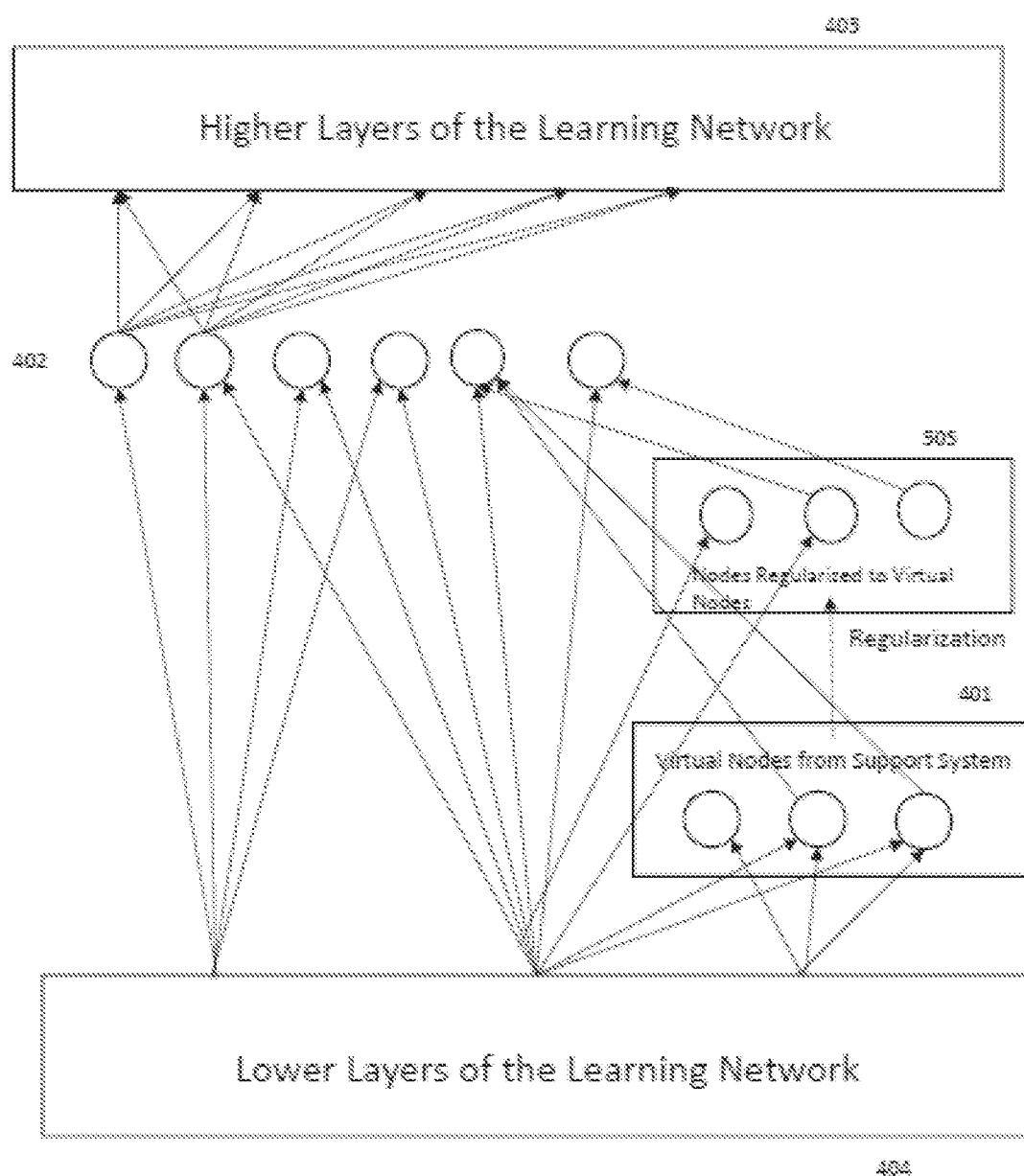

FIG. 8 illustrates another variant of the embodiment illustrated in FIG. 7. In this variant another set of nodes 505 is added to the selected layer. These added nodes 505 are in a one-to-one relationship with the virtual nodes 401 and a regularization is applied to make their activations tend to agree with the corresponding virtual nodes. Regularization is a well-known technique to those skilled in the art of statistical estimation that smooths statistical estimates and makes them more robust. In this case, the regularization consists of an additional term in the objective function during training that penalizes differences between each node in set 505 and its corresponding virtual node in set 401. The regularization and the respective dropout rates of the virtual nodes 401 and the regularized nodes 505 are all controlled by the learning coach 303, with an objective that is optimized by testing on practice data.

In this optimization, the learning coach 303 may use an objective that is different from the performance objective of the deep learning network 102. For example, the learning coach may be optimizing the regularization and the dropout rates primarily to make the knowledge in the deep learning network 102 more explicit while the deep learning network optimizes for minimum error rate.

Figure 9:
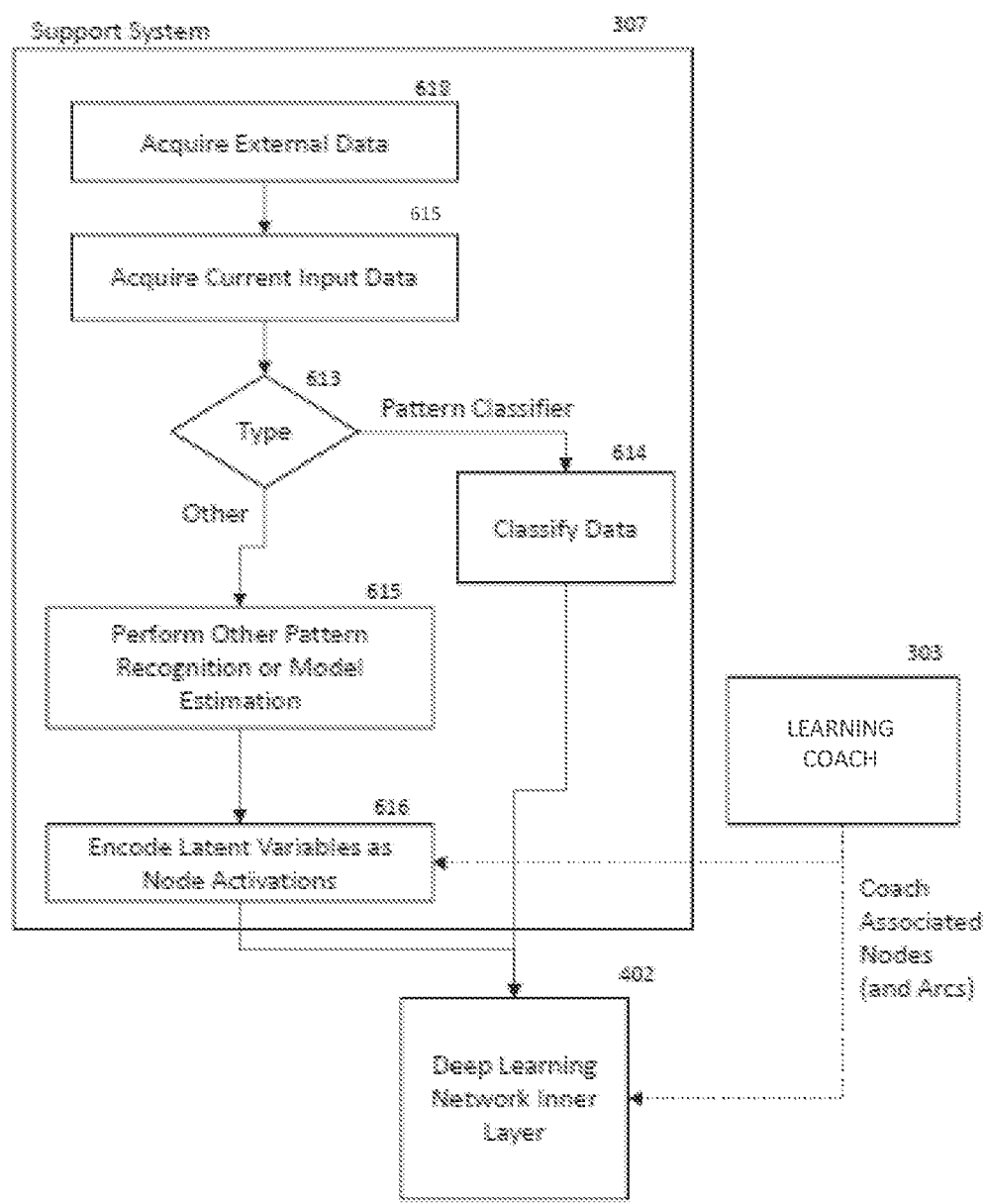
FIG. 9 is a flow chart that illustrates a process for creating explicit knowledge according to various embodiments of the present invention.

FIG. 9 is a flow chart of an illustrative embodiment of the support system 307 of FIG. 6 with a block diagram of its relationship to the learning coach 303 of FIG. 6 and the deep learning network 102 of FIG. 6. At step 618, the support system 307 under control of the learning coach repeatedly acquires external data and, at step 608, acquires a succession of instances of input data to the deep learning network inner layer 402. Note that the block 402 in FIG. 9 represents the same thing as the inner layer 402 shown in FIGS. 7 and 8. External data at step 618 is data from some source other than the input data to the deep learning network at step 608. It may be data that does not change, or that change slowly rather than for each item of input data. It may be data that is measured by other sensors. It may be present for some items of input data and not present for other. For example, in some embodiments of some applications, external data may be in the form of metadata that is in the header of a data packet that contains the primary data to be recognized. An example of metadata would be the source and destination for a phone call, or the sender and the addressee of an email. In the illustrative example of a personalized fitness program, measurements such as heart rate or blood pressure may sometimes be monitored but may not always be available. They may be external data in some embodiments, but may be input data in others.

Each instance of data is processed by the support system 307 to produce knowledge in a form that the learning coach 303 can use to inject the knowledge into a deep learning system 102. For the embodiment illustrated in FIGS. 7 and 8, this knowledge is represented as the activation values for a set of nodes. Depending on the type of pattern recognition or modeling that is being performed, the system chooses a different path at decision point 613. If the system is doing classification into a finite set of categories, then the control flow proceeds to block 614, which classifies the input data, perhaps also utilizing the external data. The output of block 614 is either a score for each possible classification category or simply an indication of the best matching category, which is equivalent to a score of 1 for the chosen category and 0 for everything else. Each category is associated with a node in the set 401 of FIGS. 7 and 8 and the corresponding score is the activation value for the node. The scores computed by the pattern classification 614 may be transformed by the learning coach 303 to make the scores compatible with the activation values used in the deep learning network 402.

If the support system is not doing classification into a discrete, finite set, then the flow of control proceeds to block 615, where another type of pattern recognition or model estimation is performed, and block 616, where latent variables from the pattern recognition or model estimation from block 615 are encoded as node activations. Flow goes in this direction, for example, if knowledge to be transferred is in the form of continuous-valued variables, rather than classification into a finite number of categories. In the exercise and fitness training application, blood pressure, heart rate, and rate of motion are all in principle continuous-valued measurements. Even if they might be rounded off to integer values in external measurements, if they are estimated by a pattern recognition system, or just smoothed by filtering they will vary as a function of time and will take on fractional, non-integer values to fit a smooth curve. Continuous-valued variables would also result if the pattern analysis system estimates a regression function rather than classification categories. Such continuous-valued variables will be coded as values in a finite set by breaking up the range of possible values into a set of intervals. The intervals may be predetermined, or they may be specified by the learning coach 303.

In some embodiments, the explicit knowledge to be transferred may just be external measurements, such as blood pressure readings without any smoothing or re-estimation in the support system. In an embodiment in which all of the knowledge to be transferred is already known from external measurements, then the support system would not need to do any pattern recognition or modeling. However, even in that case, the set of values of the external measurements might be mapped into a finite set of nodes representing intervals in the range of possible values.

In another aspect, rather than performing pattern recognition per se, block 616 may build and estimate a model for phenomena under observation. For example, in the exercise and fitness application, the motion of the client's body and of the weights in an exercise machine may be modeled by Newton's laws of motion. As another example, in a speech recognition task, block 616 may model the speech as a hidden Markov process or as a dynamic Bayesian network, modeling techniques which are well-known to those skilled in the art of speech recognition. Speech might even be modeled as a many-layered stochastic process with layers for raw acoustic features such as amplitude as function of time and frequency, derived features such as fundamental frequency and formant frequencies, linguistic distinctive features, articulatory features, allophones, phonemes, diphones, triphones, demi-syllables including onsets and codas, syllables, words, phrase, clauses, sentences, paragraphs, dialogues, documents, books, and libraries. Some of the estimated hidden or latent random variables may be continuous-valued.

In such models, whether stochastic or deterministic, continuous-valued variables would be represented by a finite number of intervals as described above. In the Markov process model and in the Bayesian network model, the states in the Markov process or the nodes in the Bayesian network would correspond to the nodes to be cloned in virtual nodes 401 (see FIGS. 7-8).

Another aspect of performing the steps of blocks 615 and 616 occurs if more than one variable is being estimated, whether the individual variables are discrete-valued or continuous valued. Each continuous-valued variable could first be coded as a discrete-valued variable, as described above. Then, the learning coach 303 could create a separate set of virtual nodes for each variable.

Another aspect deals with the issue of determining the activation values to be used for nodes produced by blocks 615 and 616. If the nodes represent intervals of a deterministic variable, then only the node corresponding to the value of the variable would be activated. However, if the nodes represent states in a hidden stochastic process or intervals for an estimated random variable, then the node activations would represent some form of probability distribution. If the data observations are made as a function of time, then the activation values might represent either joint probabilities or conditional probabilities. The activation probabilities might be conditioned on (or joint with) either the past or the future, or both. In some embodiments, the node activations might be the probabilities themselves, perhaps normalized to sum to one across the nodes in a given set. In some embodiments, the activations might represent logarithms of probabilities, which would make them more compatible with other measurements such as distances between points and clusters. The choices among these alternatives would be controlled by the learning coach 303, which in some embodiments would perform automated testing on practice data.

Finally, the nodes and activations produced as described above could be cloned and passed to the deep learning inner layer 402 as described in the discussion of FIGS. 7 and 8.

Another aspect of the present invention deals with making implicit knowledge explicit and communicable. The support system 307 can be specifically designed to make its knowledge explicit and communicable as illustrated in FIGS. 7-9. After the processes illustrated in FIGS. 7-9 have been performed, the deep neural network 102 (see FIG. 6) will also have some knowledge that is explicit and communicable. A deep neural network that has been trained without the processes of FIGS. 7-9 may have a great deal of knowledge. Such deep neural networks have broken previous records in many benchmark tests.

However, this knowledge is implicit and is often difficult or impossible to interpret. For example, even two learning modules 101 with deep neural networks 102 having identical architectures, after many rounds of training to specialize them to different tasks as described in the discussion of FIG. 4, may have nodes with completely different patterns of activation when presented with the same data. These sibling modules would be unable to communicate their knowledge to each other. Even a deep neural network that has been coached to have explicit knowledge, such as by the procedures illustrated in FIGS. 7-9, will also have a great deal of implicit knowledge in addition to the explicit knowledge.

Figure 10:
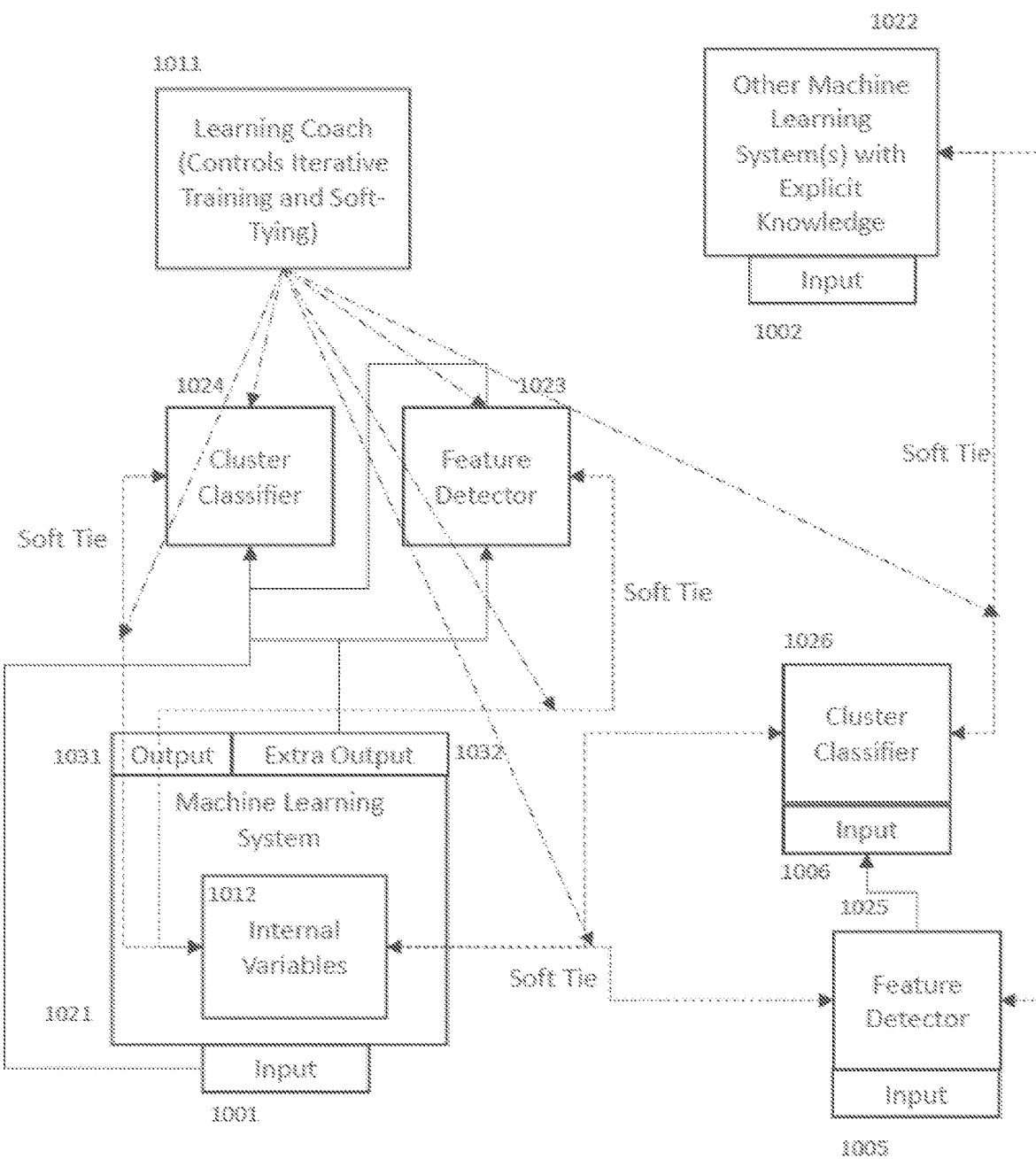
FIG. 10 is a block diagram that illustrates a system for making implicit knowledge communicable according to various embodiments of the present invention.

FIG. 10 illustrates embodiments of several methods for making such implicit knowledge explicit and communicable between machine learning systems and more easily interpretable by humans. Two forms of explicit knowledge are illustrated: (i) nodes that explicitly represent features and (ii) clusters of related data examples. The feature node knowledge and cluster knowledge can be trained jointly, and they can interact and support each other both during training and during operational use. Several illustrative means of communicating and sharing the knowledge are shown. For example, there are two forms of soft tying node activations that will be explained below. In addition, once feature nodes or clusters have been trained, say in machine learning systems 1023 and 1024 respectively, the knowledge may be used for supervised training of other systems such as machine learning systems 1025 and 1026 respectively. This supervised training can be done in either direction. For example, feature detector 1023 can be used to train feature detector 1025, or feature detector 1025 can be used to train feature detector 1023. Similarly, cluster classifier 1024 could be used to train cluster classifier 1026, and vice versa. Finally, a set of one or more feature nodes can be inserted into another network, for example, the machine learning system 1022, using the techniques described in connection with FIGS. 7 and 8.

There are six machine learning systems shown in the example of FIG. 10: machine learning system 1021 with internal variables 1012; feature detector system 1023 and 1025; cluster classifiers 1024 and 1026; and one or more other machine learning systems with explicit knowledge 1022. There can also be a learning coach 1011 that controls the iterative training of feature detector 1023 and cluster classifier 1024, as well as controlling the soft tying of node activations among the systems as well as internal soft tying of node activations within one or more of the machine learning systems.

Feature detector 1023 and cluster classifier 1024 may be trained by supervised training. In an illustrative embodiment, however, feature detector 1023 and cluster classifier 1024 are iterative trained with unsupervised learning, at least initially. If category labels are known, the data examples may be separated by category and then clusters are trained unsupervised within each category. The unsupervised training is started by assigning each data example to a cluster by any convenient means, for example randomly. Each cluster is defined by the data examples that are assigned to it. In some embodiments, each data example may be assigned to multiple clusters with each assignment having an associated weight (e.g., a confidence weight) such that the assignment weights for each data example sum to one.

Given a set of assignments of data examples to clusters, selected nodes within machine learning system 1021 can be designated as potential feature nodes for one or more clusters. Each potential feature node n designated for a cluster has its activations values $a_n(x)$ soft tied for all data examples x associated with that cluster. In this form of soft tying, an extra regularization term is added to the cost function for the potential feature node. For a data example x associated with the cluster, the regularization cost term can be based on the difference between the value $a_n(x)$ and the average activation value averaged across all data assigned to the cluster. For example, the soft tying regularization can be the L2 norm, $L2_n(x)=(a_n(x)-\mu_n)^2$. The value $\mu_n$ is the mean activation for node n over all of the data associated with the cluster. To save computation in some embodiments, this mean value is estimated from the mean value in the previous iteration.

In an illustrative embodiment, the training of the feature nodes and clustering is done iteratively. The features can be the output of dedicated feature detectors, such as the feature detector 1023 or the feature detector 1025, or they can simply be internal nodes in machine learning systems, such as machine learning systems 1021 or 1022. The iterative training can use any of many clustering algorithms that are well-known to those skilled in the art of machine learning, for example k-means clustering. In standard k-means clustering, each cluster is represented by the mean of the data examples assigned to the cluster. In a step in the iterative process, each data example is reassigned to the cluster whose mean is closest to the data example. When each data example has been reassigned, the cluster means are recomputed based on the new assignments. This iterative process is repeated until there are no changes in the assignments of the data examples or some other stopping criterion is met.

An illustrative example of training a designated set of nodes to learn features uses k-means clustering, with the data examples for the clustering using the activation values of the designated nodes instead of or in addition to the input data 1001.

The illustrative embodiment shown in FIG. 10 is more general. The simple computation of the mean of the data examples assigned to the cluster is replaced by a general purpose machine learning system 1024 or 1026 as a cluster classifier. The output of either cluster classifier 1024 or 1026 for a data example x is a set of scores with one score for each cluster. The distance between the data example x and the cluster mean, which is used in k-means clustering, is a trivial special case of the cluster classification scores that can be computed by cluster classifier 1024 or 1026, which are much more general. Either cluster classifier 1024, 1026 can approximate an arbitrary non-linear function. For example, the cluster score can represent a non-convex region or even a region that is not a connected set.

In addition, the input to cluster classifier 1024 or 1026 is not limited to the node activations of a set of designated feature nodes. In the illustrative embodiment shown in FIG. 10, blocks 1023 and 1025 are dedicated feature detectors. Again, simply copying the node activations of a set of designated feature nodes is a trivial special case of the features that can be computed by feature detector 1023 or 1025. In addition, the feature detectors 1023 and 1025 and the cluster classifiers 1024 and 1026 can have access to additional information besides the input data and the node activations of a designated set of potential feature nodes.

In addition to its normal output 1031, the machine learning system 1021 can also have a set of extra output nodes 1032. These extra output nodes can be trained by back propagation from cluster classifier 1024 and feature detector 1023 to compute any useful information that can be computed from the internal variables 1012 of the machine learning system 1021. For example, if machine learning system 1021 is a deep neural network, these internal variables include the node activations of all of the inner layer nodes as well as the input and computed output values. In addition, during training these internal variables include the partial derivatives of the cost function with respect to each of the node activations and with respect to each of the connection weights and any other learned parameters.

In addition, nodes within feature detector 1023 and cluster classifier 1024 can be soft tied to nodes within the machine learning system 1021, which in turn may be soft tied to nodes in feature detector 1025 and cluster classifier 1026. In one illustrative embodiment, feature detector 1025 and cluster classifier 1026 are dedicated stand-alone systems trained by supervised training and/or soft tying to systems, such as the feature detector 1023 and the cluster classifier 1024, or feature detectors and cluster classifiers associated with one or more other machine learning systems, such as machine learning system 1022. Soft tying of node activations between two or more nodes in separate machine learning systems is the second form of soft tying mentioned above. In this form of soft tying, the node activations being tied are in separate machine learning systems, such as systems 1021, 1022, 1025 and 1026, in which the forward activation in each machine learning system is processing the same input data example x in each of the respective inputs 1001, 1002, 1005 or 1006. In this form of soft tying, the relaxation cost is based on the mean of the activation values of all the tied nodes for the same input data example x, rather than a mean across data examples. This second form of soft tying may also be applied to learned parameters, such as the connection weights in a deep neural network. Although only a few soft tying connections are shown with the double-headed dashed lines in FIG. 10, any two machine learning systems with internal node activations or other latent variables may be soft tied, including all of the machine learning systems shown in FIG. 10. The soft tying is bidirectional.

The feature detector 1025 and the cluster classifier 1026 may be trained by supervised learning from feature and cluster assignments learned by feature detector 1023 and cluster classifier 1024. On the other hand, feature detector 1025 and cluster classifier 1026 may be trained by one or more other machine learning systems, such as machine learning system 1022. In that case, the roles may be reversed and in some embodiments, feature detector 1023 and cluster classifier 1024 may be trained by supervised learning from feature detector 1025 and cluster classifier 1026.

When feature detector 1023 and cluster classifier 1024 are trained by supervised learning, they can back propagate through the extra output nodes 1032 of the machine learning system 1021, so again they train machine learning system 1021 to provide useful computations based on any of the internal variables 1012 in machine learning system 1021.

In the illustrative embodiment, each instance of either form of soft tying is implemented as an extra term in the cost function for each of the nodes that are tied. There are one or more hyperparameters associated with each node in each instance of soft tying. For example, there is a relaxation strength hyperparameter that multiplies the difference between the activation value of a node n for data example x and the mean value across the tied data examples or the tied nodes. In some embodiments, this hyperparameter is customized according to the situation. For example, in early phases of discovering the features and clusters for machine learning system 1021, many nodes may be designated as potential feature nodes with little or no evidence yet available. In this case, the relaxation strength hyperparameter may be very small. At the other extreme, with a large value of the relaxation strength soft tying may approximate hard tying, such as the sharing of statistics for corresponding connection weights in a convolutional neural network. Thus, among other things, soft tying can implement a generalization of convolutional neural networks.

In some embodiments, feature detector 1023 and cluster classifier 1024 are treated as part of machine learning system 1021 and remain active and associated with machine learning system 1021 during operational use as well as during training. In other embodiments, feature detector 1023 and cluster classifier 1024 are only used in training. The assignments of data examples to clusters are used in the soft tying of feature nodes within machine learning system 1021. In addition, these internal feature nodes are trained by back propagation through the extra outputs 1032 and by soft tying to nodes in feature detector 1023 and cluster classifier 1024 and perhaps to one or more other feature detectors and cluster classifiers, such as 1025 and 1026.

The control of this iterative training and of the associated hyperparameters is a complex process. In the illustrative embodiment, this complex process is preferably controlled by learning coach 1011, which also controls the soft tying and associated hyperparameters.

By soft tying node activations and data clustering information, any of the learning modules 101 in FIG. 4 (or FIG. 11 described below) may share knowledge with any of the other learning modules 101. These modules would then have shared explicit knowledge with known correspondence between their respective cloned virtual nodes. There would also be a known correspondence between the associated nodes regularized to the cloned virtual nodes.

Figure 11:
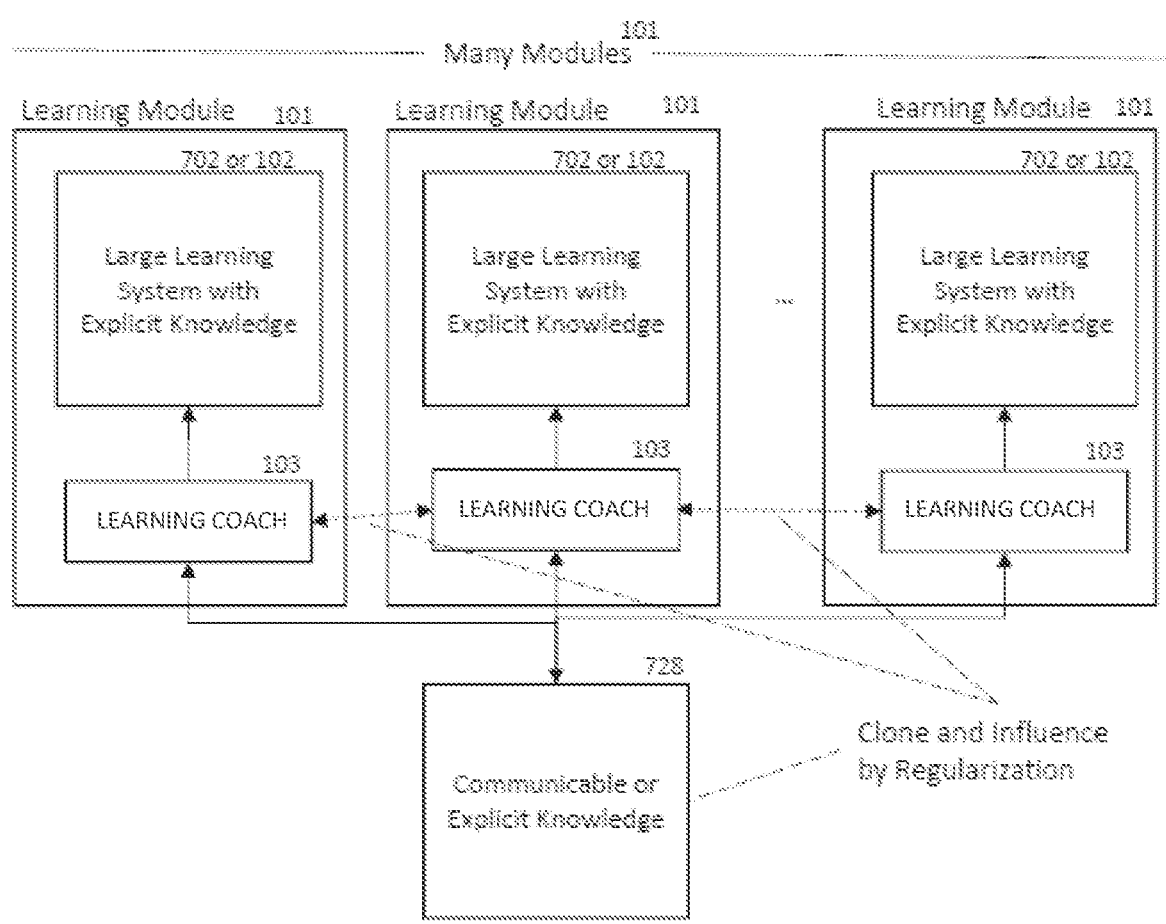
FIG. 11 is a block diagram of a large machine learning system that share knowledge among machine learning modules of the system according to various embodiments of the present invention.

As a further aspect, the corresponding nodes in two or more deep learning networks 102 regularized to virtual nodes cloned to the same external knowledge representation node could in turn be regularized to each other. This regularization could be maintained in further training even when the cloned explicit knowledge is not present. This aspect is illustrated in FIG. 11, in which the large learning networks can be viewed either as large learning networks 102 as illustrated in FIGS. 4 and 6, or as machine learning systems such as 1021 as illustrated in FIG. 10. Explicit knowledge is communicated as illustrated in FIGS. 7 to 9 or as illustrated in FIG. 10.

When a pair of connected nodes in a learning network 102 or 1021 is regularized to a corresponding pair of nodes in another learning network, their connection weight may also be regularized, subject to testing of the effectiveness of the connection regularization by the learning coach. Regularization of the connection weights may be especially effective if an entire set of source nodes are regularized and an entire set of destination nodes are regularized and if there are very few other source nodes connected to the destination nodes. Then all the connections between the source nodes and the destination nodes may be regularized.

This cross-module regularization enables two or more learning modules to share knowledge over a data communication channel even with the lower bandwidth that would be available outside a GPU cluster. In most embodiments, only a small fraction of the nodes would represent explicit knowledge and only a fraction of those would be regularized across modules. Furthermore, regularization is only a weak link and would not require communication with every data item for nodes or every update for connection weights.

As a further aspect of the present invention, this sharing of knowledge does not have to be communicated all at once to the entire collection of learning modules 101. Instead, as described in U.S. Pat. No. 8,331,657 (which is incorporated herein by reference) knowledge could at first be shared with a few other modules. The knowledge could be tested by the learning coaches to see if it improves the performance of those other modules. Knowledge that did not improve the performance of an adequate fraction of the testing system could be rejected. Knowledge that improved the performance of many of the testing systems could be passed on to additional systems.

Figure 12A:
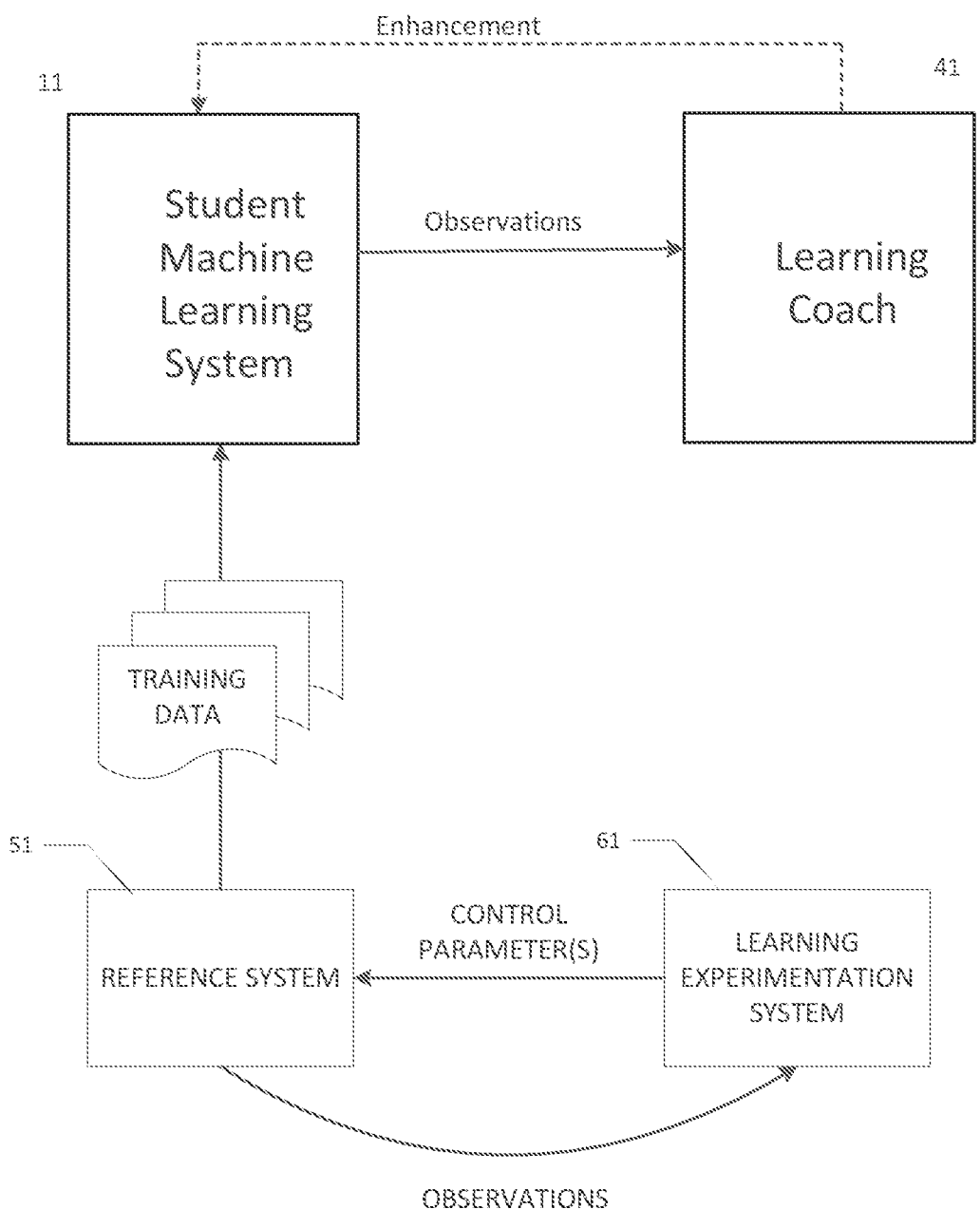

Another embodiment of the training of the learning coach 41 is illustrated in FIG. 12A. In this diagram, two new components have been added to the components shown in FIG. 1. There is a reference system 51 and a learning experimentation system 61. In FIGS. 1, 2, and 3, the learning coach 41 may learn by passively observing the effect of the hyperparameters on the subsequent learning performance of the student system 11. In the embodiment illustrated in FIG. 12A, the reference system 51, under control of the learning experimentation system 61, generates a set of training data for supervised training of student learning system 11.

According to various embodiments, learning experimentation system 61 in FIG. 12A actively designs and controls the reference system 51 to provide tasks for the student system 11 such that the learning coach 41 can learn from observing the learning behavior of student system 11 in specially designed situations that will be instructive for the learning coach 41.

Learning experimentation system 61 can use the reference system 51 to generate data to create a specific and well controlled learning task for system 11. The reference system 51 may be, for example, a classifier, a synthesizer/generator, or a combination of the two. The synthesizer or generator may be any of many forms. For example, it may be a variational autoencoder, a generative adversarial network, a Boltzmann machine, a parametric synthesizer, and others. All these and other forms will simply be referred to as "synthesizers." It is used to generate labeled data for supervised training of the student machine learning system 11. In various embodiments, the reference system 51 does not need to be the same form or type of machine learning system as the student machine learning system 11. For example, the student machine learning system 11 may use a neural network and the reference system 51 may not, and vice versa. As a different example, reference system 51 may be a support vector machine (SVM) or a random forest, while student machine learning system 11 may be an ensemble of deep neural networks. On the other hand, the reference system 51 may be exactly the same type and form as student machine learning system 11. For example, they may both be deep neural networks with identical architectures that only differ in the values of their connection weights. This flexibility makes it possible for the learning experimentation system 61 to construct experiments in which the learning coach 41 can observe the learning behavior of student learning system in situations that create specially designed difficulties for stochastic gradient descent or whatever other learning algorithm student machine learning system 11 may employ.

Figure 12B:
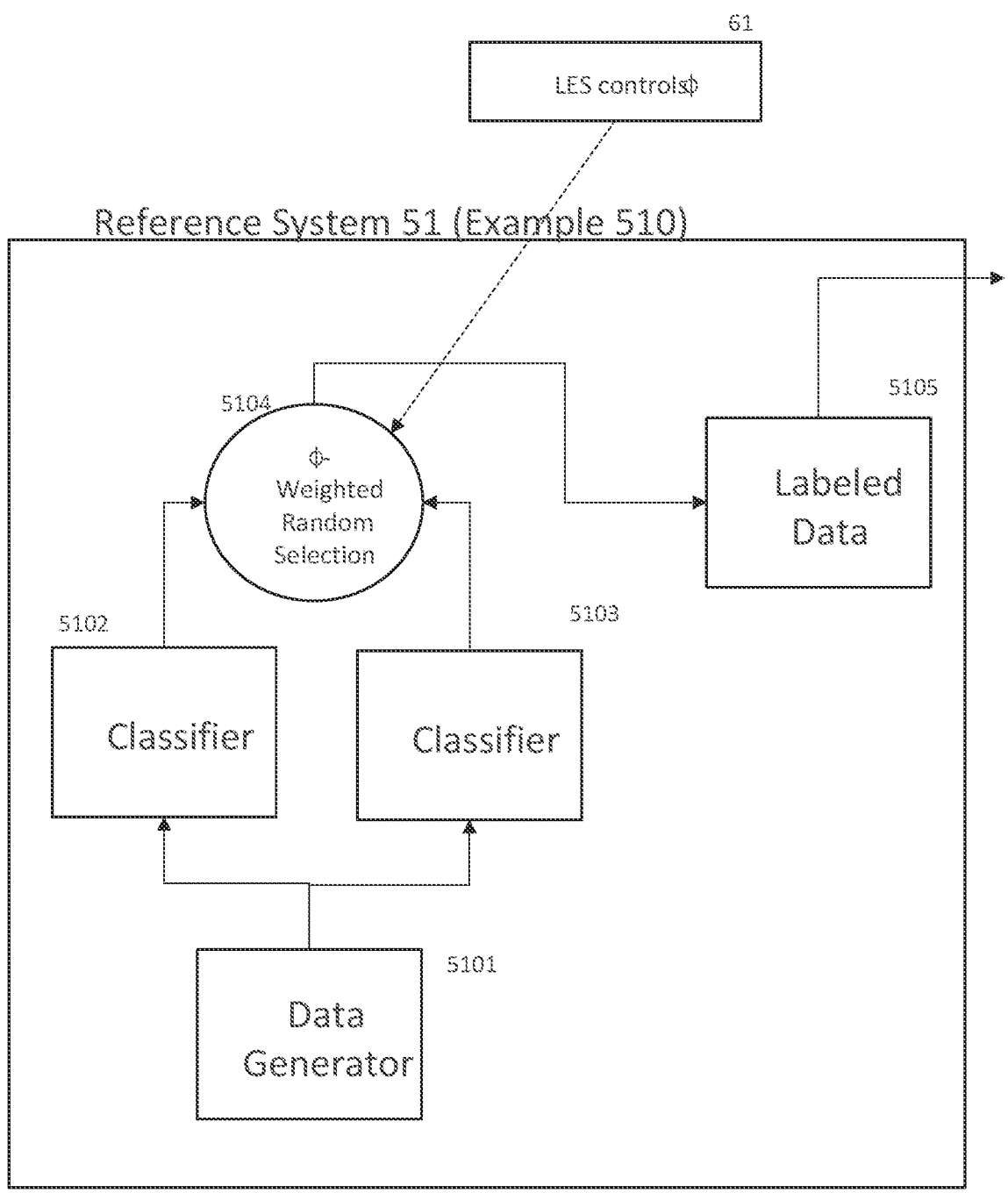

As an illustrative example and not by way of limitation, FIG. 12B shows a reference system 510 that is an example of reference system 51 in FIG. 12A. System 510 is tunable under control of the learning experimentation system 61 to produce an unlimited number of learning problems for student system 11 to solve while being observed and coached by learning coach 41.

Block 5101 is a generator of feature vectors in the space of input data vectors for student system 11. Generator 5101 may be some form of synthesizer or simply any source of real or randomized data. The probability distribution of the data does not really matter, as long as the data is not clumped in too small a region of data space. It does not matter whether the data is labeled. Any labels can be replaced by the labels computed by either classifier 5102 or classifier 5103. Oval 5104 represents an operation that randomly selects either the label supplied by block 5102 or the label supplied by block 5103. Learning experimentation system 61 controls a parameter $\phi$ so that oval 5104 selects the label from block 5102 with probability $\phi$ and selects the label from block 5103 with probability $(1-\phi)$. The data generated by the data generator 5101 is thus classified or labeled by one of the classifiers 5101, 5103. The labeled data 5105 can then be input to the student learning system 11 for training.

The reference system example 510 shown in FIG. 12B is for illustrative purposes only. In other embodiments, there can be any number of classifiers. In some embodiments, the learning experimentation system 61 can directly control and make changes in the classifiers. Synthesizers can be used instead of classifiers. These and many other embodiments are within the scope of the invention. Block 5101 is a generator of data in the broadest sense of that word. Reference system 51 produces labeled data in the broadest sense of that phrase. The data it generates does not need to match real data. The data can be easier (in terms of pattern recognition) when learning coach 41 is not yet well trained. It can be more challenging than real data when learning coach 41 is ready for difficult challenges. It may use synthesizers rather than classifiers. It may mix data from multiple sources. The probability distributions of its data are arbitrary. Whatever the characteristics of the labeled data it generates, it creates a learning task for student system 11 and therefore produces training data for learning coach 41.

Figure 12C:
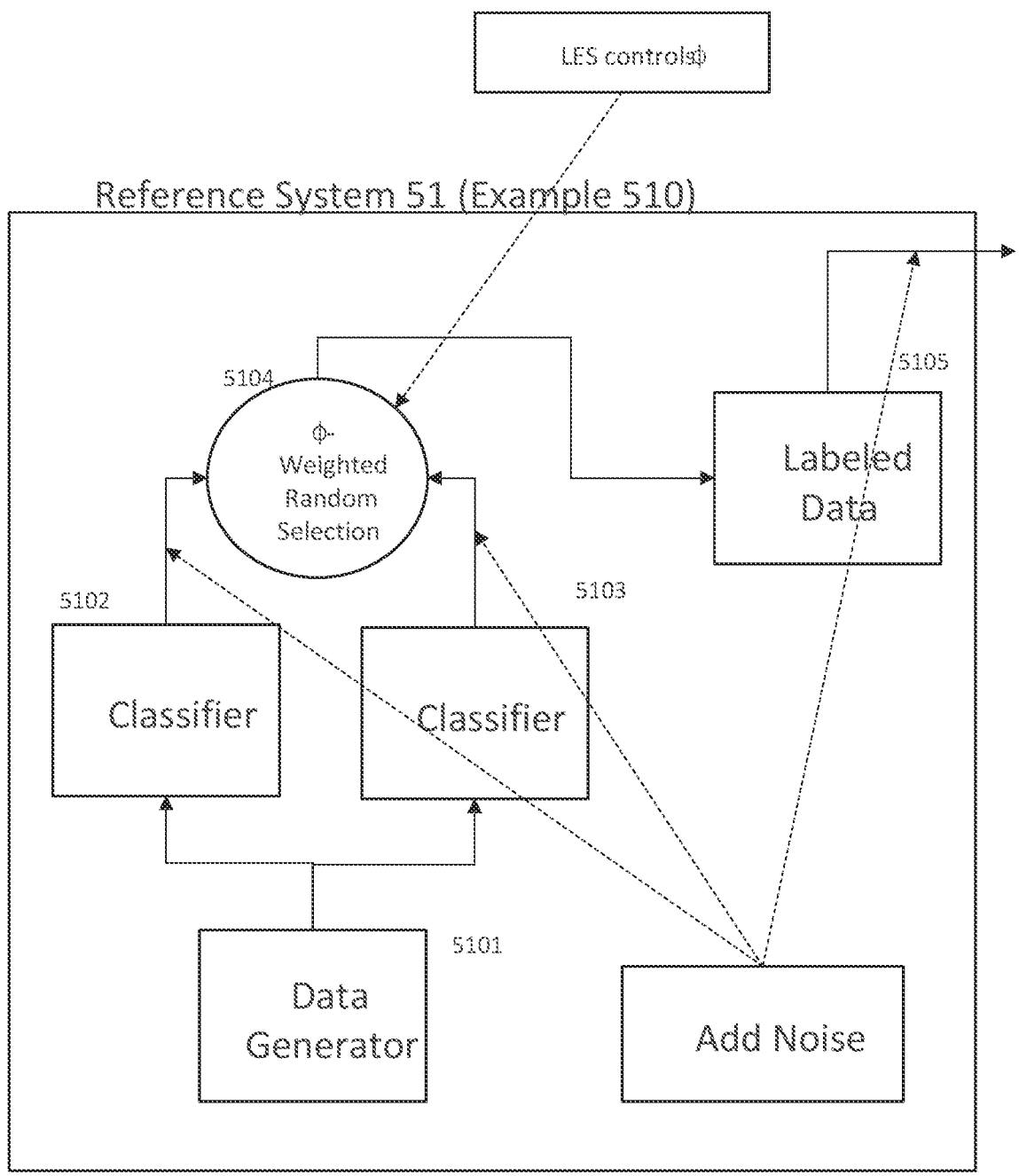

FIG. 12C shows the same reference system as FIG. 12B, but with added noise. FIG. 12C will be discussed in more detail after introducing the embodiment shown in FIG. 12D.

Figure 12D:
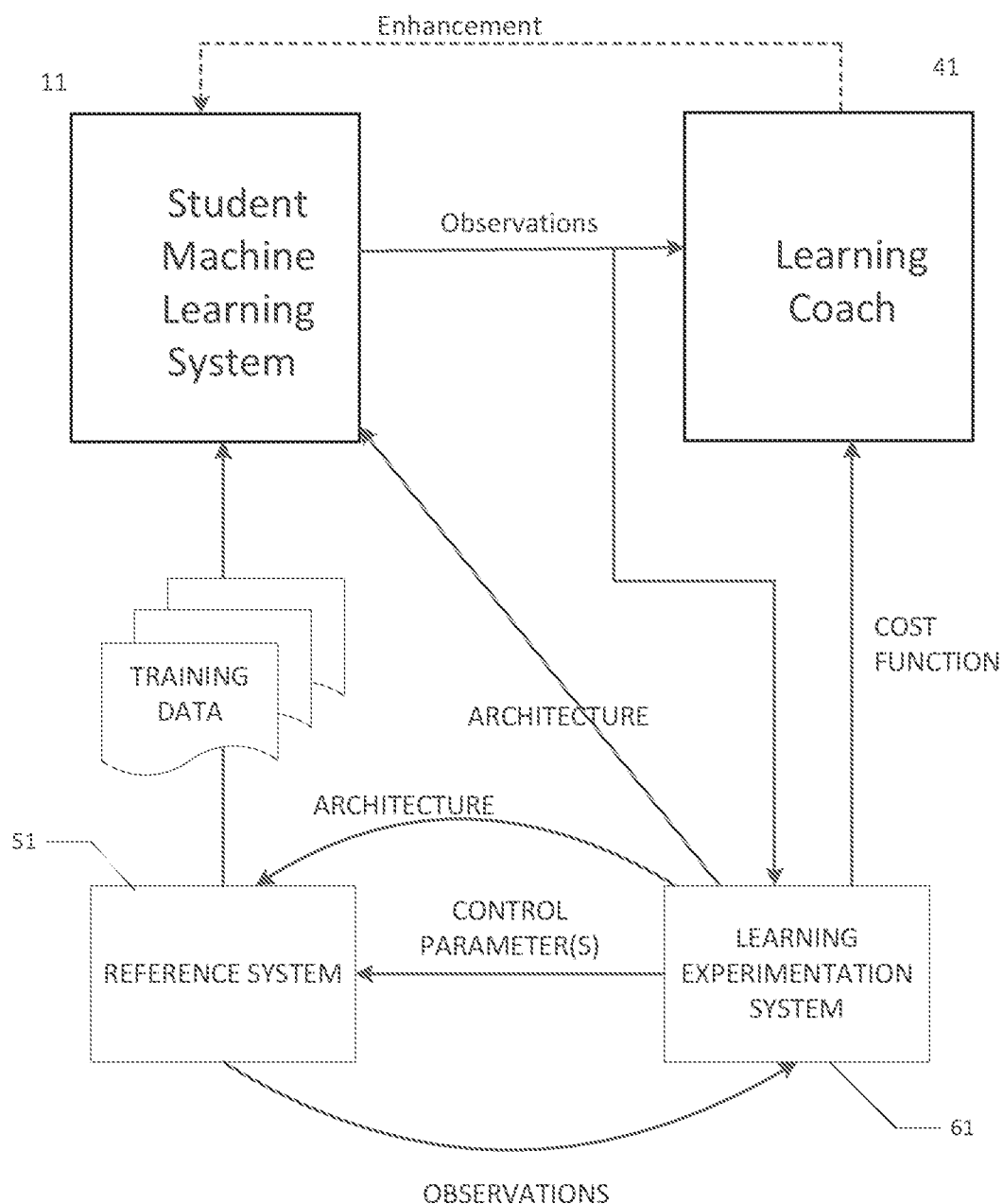

In another aspect of the invention, learning experimentation system 61 sets up learning experiments in which the student learning system 11 must learn to imitate the reference system, as illustrated in FIG. 12D. In this embodiment, the learning experimentation system 61 specifies the architectures for both the reference system 51 and the student learning system 11. For example, the learning experimentation system 61 can specify architectures (e.g., layers, nodes, connection weights) such that it is possible for the student learning system 11 to exactly duplicate the classification done by the reference system 51. The architecture of the student learning system 11 may be a copy of the architecture of the reference system 51, or the architecture of the student learning system 11 may have additional parameters and the student learning system 11 may be capable of a superset of the computations that can be done by the reference system 51. One implementation of the embodiment illustrated in FIG. 12D is to use the tunable reference system shown in FIGS. 12B-C with a value of the control parameter, $\phi$, in the range from 0 to 1. This implementation embeds the particular reference classifier in a continuum of similar classifiers, which gives learning experimentation system 61 more ways to design learning experiments for the learning coach 41 to observe.

In this illustrative embodiment, the learning experimentation system 61 also receives observations from the student learning system's learning behavior and performance and creates reference classifiers and a student learning system that all have the same architecture. This property enables the learning experimentation system 61 to precisely design and monitor the learning task for the student learning system 11 and thereby to provide instructive examples for the learning coach 41 in determining the best values for the hyperparameters. For example, suppose classifiers 5102 and 5103 are both of the same type as the student learning system 11 and only differ from student learning system 11 in the values of trainable parameters, such as the connection weights in a neural network. If $\phi=1$, then, if the student learning system 11 has exactly the same parameter values as classifier 5102, it will classify everything the same way as classifier 5102 and will have zero errors, which is also a minimum in the error cost function.

For example, denote the parameter settings for classifier 5102 as $\theta_1$ and the parameters settings for classifier 5103 as $\theta_0$. If $\phi=0$, then the minimum in the error cost function, which can be computed by the learning experimentation system 61 based on the observations from the student system 11 and the reference system 51, will be for the parameter values such that student learning system matches classifier 5103. For intermediate values of $\phi$, the location of the global minimum of the cost function will move along some path from $\theta_1$ to $\theta_0$ as goes from 1 to 0. Except for values of $\phi$ close to 0 or 1, generally neither $\theta_0$ nor $\theta_1$ will be a global minimum in the cost function. Generally, each of them will be at or near a local minimum or a saddle point in the error cost function. That is, they will be at or near a point at which the learning progress will be slow or at which the learning process will be wrongly converging to a local minimum instead of the global minimum. Therefore, many values of $\phi$ will provide good test cases from which the learning coach 41 can learn the most effective hyperparameter values for overcoming difficulties in the learning process.

In addition to simply choosing a value of $\phi$ that presents a learning problem for student system 11 and a hyperparameter tuning observation for learning coach 41, the learning experimentation system 61 can construct many other experiments. For example, even with just the simple control $\phi$, it can create a learning problem by suddenly significantly changing the value of $\phi$. Generally, such a change in $\phi$ will change the position of the minimum in the error cost function. That is, it will change the values of the parameters to which the gradient descent learning algorithm is attempting to converge. Such a change will create a new learning problem for student machine learning system 11 and a new set of observations for learning coach 41.

The range of the experiments discussed with respect to FIG. 12B can be expanded by adding optional noise, as shown in FIG. 12C. The noise can be added to the output of the classifiers 5102 and 5103 or to the labeled data stream as it leaves block 5105. In this embodiment, because of the added noise, the minimum error is not necessarily zero, and neither the student learning system 11 nor the learning coach 41 can tell for sure when the minimum in the error cost function has been achieved. However, the learning experimentation system 61 has that information and can use it in designing the learning experiment.

In the illustrative example of FIG. 12D, exact imitation is possible if there is effectively only one classifier in the reference system; that is, if $\phi=0$ or $\phi=1$. The learning experimentation system specifies a student learning system 11 architecture that is capable of computing any classification computable by the single reference classifier. Additionally, the learning experimentation system optionally specifies a value of that is close to, but not equal to, 0 or 1, so that the minimum classification error is not necessarily zero. In addition, the learning experimentation system optionally adds noise to the outputs of classifier blocks 5102 and 5103, or to the output of the labeled data block 5105, as shown in FIG. 12C. For example, the learning experimentation system can set a value c that is close to zero and generate a random number X from the uniform distribution on the interval [0, 1]. If is X<$\epsilon$, then the learning experimentation system 61 can substitute an incorrect classification as the output of 5102, 5103, or 5105.

In this embodiment, the learning experimentation system 61 knows much more than in the embodiments in which student learning system 11 is not capable of imitating the reference system. Thus, in this illustrative embodiment, the learning experimentation system 61 has much more knowledge and control over the state of the learning process of student learning system 11. Basically, it knows the minimum error rate and the optimum values for the parameters, but it does not supply this information directly to the learning coach 41 or the student learning system 11. To the learning coach 41 or the student learning system 11, an experiment in this illustrative embodiment appears the same as any experiment in which the learning experimentation system 61 merely sets up the initial conditions and controls $\phi$. Learning experimentation system 61 therefore has much greater control and capability in designing experiments by which learning coach 41 can learn to set hyperparameters, as well as to make modifications in the structure of student learning system 11 and to control data selection, as will be described later.

With $\phi=0$ or $\phi=1$, and without added noise, the minimum error is 0, and that minimum is achieved by student learning system 11 having parameter values that exactly copy classification done by the active classifier block, either 5102 or 5103, in the reference system 51. For a small amount of noise and a value of $\phi$ close to 0 or 1, the parameter values at which student learning system has a minimum cost is still close to the parameter values in the active classifier in the reference system 51.

With this information, the learning experimentation system 61 knows how close or far the current parameter values are from the values for the minimum. It also knows whether the direction of stochastic gradient descent is toward that minimum, or if it is wandering in a different direction. It can estimate the effect of different hyperparameter values without having to run as many trial and error experiments. In the illustrative embodiment, the learning experimentation system 61 uses this information to create a cost function for learning coach 41. Thus, the learning coach 41 can do supervised learning with an algorithm such as stochastic gradient descent, rather than trial-and-error learning.

If learning experimentation system 61 supplies a cost function for the learning coach 41, as described in reference to FIG. 12D, that cost function may include the cost of computation as well as the cost of the errors made by the student learning system 11.

Although the embodiment of FIGS. 12A-C has been discussed in reference to embodiments of FIG. 12D, in which both classifiers 5102 and 5103 of FIGS. 12B and 12C have the same architecture as student learning system 41, it is to be understood that this example is for the purpose of illustration of the embodiment shown in FIG. 12D and is not a limitation of the invention. Indeed, even in embodiments of FIG. 12D, one of the classifiers 5102 or 5103 may be of a completely different type than student learning system 11. In more general embodiments of FIG. 12B, both classifiers 5102 and 5103 may be of a completely different type than student learning system 11.

For example, classifier 5102 may be a support vector machine (SVM), and classifier 5103 may be based on a hidden Markov process model (HMM), while student learning system may be a decision tree. Other variations are possible. When one or both of the classifiers 5102 or 5103 is a different type than the student learning system 11, the learning task is called transfer learning, rather than imitation. In this illustrative embodiment of transfer learning, learning experimentation system 61 does not in general know the optimum solution. On the other hand, since learning experimentation system 61 can choose one or both classifiers in the reference system from all the different kinds of machine learning systems, it can generate more kinds of learning experiments from which learning coach 41 may be trained.

Although the embodiments of the reference system 51 shown in FIGS. 12B-C have only two classifiers, it is to be understood that any number of classifiers could be used. Furthermore, either or both classifier 5102 or classifier 5103 may be an ensemble of classifiers. Indeed, each of them can be a heterogeneous ensemble, mixing different types of machine learning systems. Student learning system 11 may also be either a homogeneous or a heterogeneous ensemble.

In each of the embodiments discussed with regard to FIGS. 12A, 12C and 12D, the learning experimentation system 61 constructs a number of experiments providing data from which learning coach 41 is trained to recognize patterns for predicting the best customized hyperparameters. Learning coach 41 learns from the entirety of these experiments, not just from the experience coaching a single student learning system 11.

Another general aspect of the invention according to various embodiments is that the learning coach 41 can make structural changes in student learning system 11. For example, if student learning system 11 is a neural network, learning coach 41 can add or delete connections, nodes, or groups of nodes, even entire layers of nodes. When learning coach 41 makes a decision, such as a structural change, or estimates a discrete variable, rather than a continuous variable or hyperparameter, it can represent its task as a classification problem rather than as a regression. For example, if learning coach 41 is a neural network, it can use a softmax function on a set of output nodes rather than linear nodes.

When learning coach 41 makes structural changes to the student learning system 11, it affects not just the learning rate but also the minimum cost. It also affects the amount of computation required by student learning system 11. One aspect of the present invention according to various embodiments is that learning coach 41 can have an objective that is different from the objective of student learning system 11. For example, in evaluating structural changes, learning coach 41 may optimize some combination of cost of computation and some measure of the error rate of a given structure, whereas student learning system 11 just minimizes some measure of the cost of errors for a fixed structure.

In one illustrative embodiment, learning coach 41 trains itself to make decisions about structural changes in student learning system 11 by running experiments. In this illustrative embodiment, learning coach 41 implements two versions of student learning system 11, one with the structural change and one without. Learning coach 41 trains both versions of student learning system 11 and evaluates their comparative performance on an independent evaluation set. It also measures or estimates the comparative computational requirements for the two versions. This trial-and-error experimentation, by which learning coach 41 learns to make decisions about structural changes in student learning system 11, is similar to the trial-and-error process of estimating customized hyperparameters illustrated in FIGS. 2 and 3.

Another illustrative embodiment for training learning coach 41 to make structural changes in student learning system 11 is illustrated in FIG. 12A, in which learning experimentation system 61 constructs the experiments to train learning coach 41. In this embodiment, learning experimentation system 61 can construct a wide variety of situations including situations in which the reference system 51 has a different structure and more or fewer parameters than student learning system 11. In some embodiments, illustrated by FIG. 12D, learning experimentation system 61 can specify architectures for the reference system 51 and the student learning system 11 that are structurally differ but such that learning coach 41 can make structural changes in student learning system 11 such that the structure of learning system 11 becomes the same as the structure of reference system 51.

For this embodiment, the minimum error will be achieved when student system 11 can generate the same classifications as reference system 51. Generally, this will require the structure of student learning system 11 to be the same as or a superset of the structure of reference system 51. Generally, the optimum combination of minimizing the computational cost and the cost of errors will be achieved when the structures of learning system 11 and reference system 51 are the same. In any case, learning experimentation system 61 can impose a cost function on learning coach 41 such that the minimum is achieved when learning coach 41 changes the structure of student system 11 to match the structure of reference system 51.

Learning experimentation system 61 can create multiple experiments for which learning coach 41 must learn to make changes in the structure of student learning system 11. As before, learning coach 41 can learn from prior experience on a variety of structures to recognize patterns to make decisions to change the structure of student learning system 11, not just from the current example.

In some embodiments of the invention, the student learning system 11 is an ensemble of machine learning systems rather than a single machine learning system, as is shown in FIG. 13. One illustrative embodiment of the learning coach 41 making a structural change to student learning system 11 avoids making a decision as to which version of the structure should be used for continued training. In this illustrative embodiment, both the original ensemble component 801*b* and the modified ensemble component 801*c* are retained as members of the ensemble, creating an ensemble with two members from a single machine learning system, or increasing the number of members in a machine learning system that is already an ensemble. Viewing the whole ensemble as the student learning system 11, starting with the case of a one member ensemble, adding a member to the ensemble is just an instance of making a structural change in student learning system 11. This instance of a structural change is treated like any other structural change.

The ensemble student learning system 11 as in FIG. 13 also illustrates another aspect of the invention according to various embodiments, which is the ability of learning coach 41 to control the selection of data 821 for student learning system 11. In this illustrative embodiment, the learning coach 41 selects different subsets of the data to send to different members of the ensemble, by sending appropriate control signals to the data switching network 831. However, the student learning system 11 of FIG. 13 is only one illustrative embodiment. The embodiment may also be used with any ensemble machine learning system, including ensembles that include a heterogeneous mixture of machine learning components of different types.

In this illustrative embodiment, the data selection is done by a preliminary classifier 803, as shown in FIG. 15. The preliminary classifier 803 is trained under the guidance of the learning coach 41, for example. The preliminary classifier 803 may have a major favorable impact on the computational cost of the ensemble as a whole. For example, in a very large ensemble, with thousands or millions of components, the preliminary classifier 803 may select only a very small fraction of the ensemble components to receive each data example, both in training and in testing and operational use. The amount of computation for either training or operation tends to grow at least proportional to the amount of data. Therefore, with a large ensemble, the preliminary classifier 803 may be able to reduce the amount of computation by orders of magnitude. In the illustrative embodiment, the preliminary classifier 803 is not trained simply as part of the ensemble system. For example, even if the preliminary classifier 803 and all the ensemble components 801*a-d* are neural networks, the preliminary classifier 803 is not trained merely by back propagating the derivative of an error cost function back through the ensemble members 801*a-d* and then through the preliminary classifier 803, as might be done for one large combined network. Instead, the preliminary classifier 803 can trained directly by the learning coach 41, for example, to optimize a combination of the cost of errors and the cost of computation for the ensemble as a whole.

In the example illustrated in FIG. 13, a new ensemble member 801*c* has been created by the learning coach 41 by making a change in an original ensemble member 801*b*, with both the old member 801*b* and the new member 801*c* retained in an expanded ensemble. If the difference between 801*b* and 801*c* is small, then there may be a significant increase in the amount of computation without much reduction in the error rate.

However, the preliminary classifier 803 illustrated in FIG. 15 can both reduce the amount of additional computation and help train ensemble members 801*b* and 801*c* to reduce the error rate. In this illustrative embodiment, the preliminary classifier 803 would select different data to send to ensemble member 801*b* than to ensemble member 801*c*. An important property of preliminary classifier 803 is that it performs that same preliminary classification on test data as on training data.

In one illustrative embodiment, the learning coach 41 tests both the original ensemble member 801*b* and the new ensemble member 801*c* on a set of validation data. In this illustrative embodiment both 801*b* and 801*c* are to be retained. The test on the validation data provides training data for preliminary classifier 803. For each item of data, preliminary classifier needs to decide whether to distribute the item to ensemble member 801*b*, ensemble member 801*c*, or both. In one illustrative embodiment, the preliminary classifier 803 is trained with supervision to try to predict which of the two ensemble members 801*b* or 801*c* will have a higher score for the correct answer. It then sends that data item to the ensemble member that it predicts will have the higher score.

This illustrative embodiment applies to a preliminary classifier 803 used in combination with any ensemble of classifiers 801*a-d*, whether or not the ensemble of classifiers are obtained by the learning coach 41 adding members to an ensemble by modifying existing members. For any ensemble of classifiers 801, a preliminary classifier 803 can be trained by supervised learning to predict, for each member of the ensemble, the probability that the given member of the ensemble will correctly classify a given input data item. In this supervised training, the preliminary classifier does not classify the input data item and is not told the correct category to classify the given input data item. Rather, in its supervised training, the preliminary classifier is merely told which of the ensemble members successfully classify the given data. Thus, the preliminary classifier learns to predict the probability of success of the ensemble members, which is what it needs to know in deciding which ensemble members should be assigned each item of data.

Once an initial version of preliminary classifier 803 has been trained, an iterative process can be performed in which 801*b* and 801*c* are retrained, with each of them receiving as training data only the data the preliminary classifier selects for each of them. Thus, ensemble members 801*b* and 801*c* will learn to specialize on the respective data selected for each of them by preliminary classifier 803. Then the process is iterated, with ensemble members 801*b* and 801*c* again both classifying a shared validation data set, which is used to retrain preliminary classifier 803, and the process is repeated until convergence or some other stopping criterion is met.

In the illustrative embodiment, the preliminary classifier 803 selects one or more destinations for each data item. In this embodiment, the learning coach 41 can control one or more locally optimized hyperparameters that control the average number of ensemble members that receive each item of data. For example, let MaxScore be the best score from the preliminary classifier, and let h be a hyperparameter controlling the distribution of data. The learning coach 41 can set a score threshold h, such that only destinations that get a preliminary classifier score s>MaxScore−h receive a given item of data, during either training or recognition.

FIG. 15 illustrates another aspect of the invention according to various embodiments. In the embodiment illustrated in FIG. 15, the learning coach 41 combines its ability 322 to control hyperparameters with its ability 332 to modify the structure of the student machine learning system 11. In this illustrative example, the learning system 11 is a deep learning neural network. The specific type of modification 332 to the structure of student learning system 11 made by learning coach 41 is the addition of one or more nodes or arcs to the network 11. In the control of the hyperparameters 322 in the embodiment illustrated in FIG. 10, the learning coach 41 controls the learning rate of the new parts of the structure differently from the learning rate for the older parts of the network in student learning system 11.

In the embodiment illustrated in FIG. 15, two issues are important. When new structure is added to a network that has already been extensively trained, the parameters associated with the new part of the network may need more training than the parameters associated with the older parts of the network. On the other hand, the training of the new network should be managed in such a manner that is does not disturb the performance that the old network achieved before the addition. As explained in the discussions of the other figures, the learning coach 41 can learn to optimize the control of the learning of each parameter with customized hyperparameters. In FIG. 15, this ability is focused on the issues that are important in this situation by supplying examples of the student learning system being trained in similar situations. That is, the learning coach 41 learns to optimize the relative learning rate of the new additions to the structure of the student system 11 by observing other examples in which nodes and arcs have been added to a student system 11.

An important special case of the embodiment illustrated in FIG. 15 is the addition of an entire layer of new nodes and their associated arcs to the network of student learning system 11. In prior art methods, it has been observed that, as layers are added to a deep neural network, eventually performance degrades not only on test data, but even on training data. In the embodiment illustrated in FIG. 16, the learning coach 41 initializes the weights in the added layer, or other substantial new structure, such that the performance of the larger network at least matches the performance of the smaller network. For example, the learning coach may initialize the weights and biases of the added structure to be an identity mapping. If necessary, the added structure is expanded by adding even more additional nodes with linear or piecewise-linear units so that the added structure can directly match the identity function. Then, the learning coach 41 manages the further learning to guarantee that the performance of the now-larger student learning system network 11 on training data is always at least as good on the training data as previous performance of the smaller system. For example, whenever a gradient descent step produces a degradation in performance, the learning coach 41 can decrease the step size. By the definition of the gradient, if the gradient is non-zero, there is always a step size such that there is no degradation in performance. The learning coach 41 can add nodes to an existing layer in the student learning system 11 in the same way. In fact, when adding nodes to an existing layer, the additional nodes can be initialized to the identity function, from the point of view of the rest of the network, simply by initializing the weights of the output connections from the new nodes to zero. Thus, any addition to an existing network can be made with a guarantee that there will be no degradation in performance.

This embodiment can add additional layers to a deep neural network at any place in the existing student network 11. It can add an additional layer after the existing output layer, an additional layer just before the existing output layer, an additional layer just after the input layer, or an additional layer between any two existing layers. It can grow a neural network to an arbitrary depth without any degradation of performance.

The learning coach can also add other substantial structures to the student system 11 without degradation in performance. For example, it can copy a subnetwork of another network, or it could copy a subnetwork from one part of student network 11 to another. In other words, it can add structure (layers and nodes, their connections and their weights) to an existing network, where the added structure replicates the subnetwork being copied. In the case of a copied subnetwork, the copying would add additional features to the location in the network to which the subnetwork is copied. Thus, the copying would transfer knowledge from the source location to the destination location, whether the locations are in two different networks or in the same network.

Figure 17:
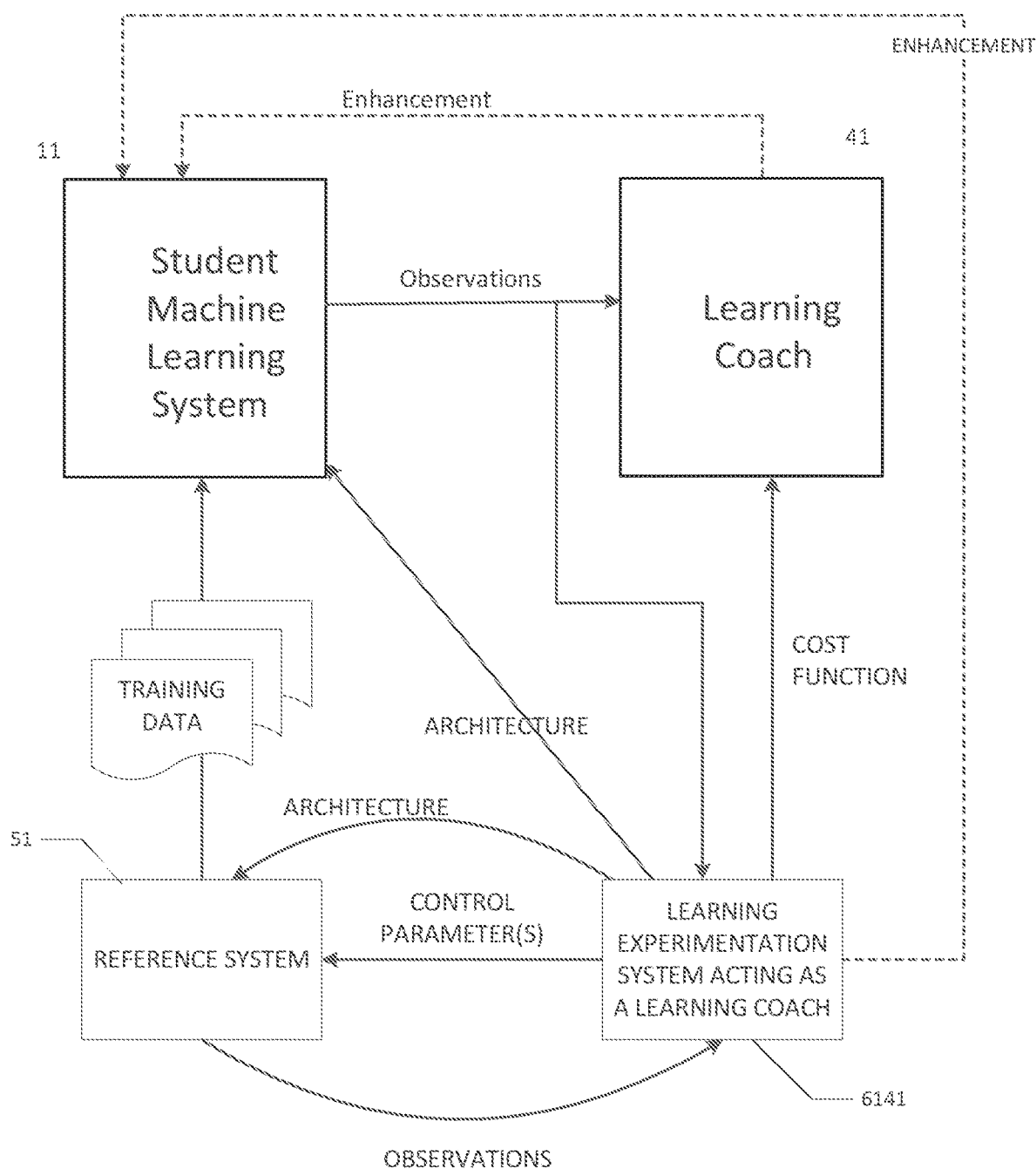

FIG. 17 illustrates another embodiment of the present invention for transfer learning. Except for the learning experimentation system, the components of the system illustrated in FIG. 17 are essentially the same elements as in FIG. 12D, except in the embodiment illustrated in FIG. 17, the learning experimentation system and coach 6141 also acts as a learning coach and directly controls the learning of the student system 11, rather than merely constructing experiments to support the learning by the learning coach 41. However, unlike the learning coach 41 described previously, the learning experimentation system and coach 6141 knows and controls the structure and parameters of the reference system 51. Thus, learning experimentation system and coach 6141 can directly optimize the ability of student system 11 to imitate reference system 51, subject to cost-performance trade-offs and other constraints.

In addition, the learning experimentation system and coach 6141 can change the reference system 51. It can change the reference system 51 to make it easier for the student system 11 to learn to imitate it. It also can change the reference system 51 such that the student system 11 can learn something new once it has already learned from the earlier version of the reference system 51.

In one illustrative embodiment, the reference system 51 is a tunable system, such as illustrated in FIG. 12B. In this embodiment, the reference system 51 is a weighted combination of an arbitrarily large ensemble of machine learning systems. The learning experimentation system and coach 6141 can dynamically change the combining weights in the reference system 51 to help student system 11 gradually learn to adapt to model new data that is substantially different or to adapt to any other substantial changes in its classification task. For example, if the student system 11 is a speech recognition system, learning experimentation system and coach 6141 can dynamically change the reference system 51 so that the student system 11 can adapt to a new speaker's voice, to a new dialect, or even to an entirely new language. In a computer vision system, the learning experimentation system and coach 6141 can guide the student system 11 to gradually adapt from one database of images to a database of different kinds of images.

In another illustrative embodiment, the reference system 51 is any large complex machine learning system or an ensemble of machine learning systems, and the student system 11 is a simpler machine learning system that uses less computational resources, such as less computation time, fewer cores or less memory. In this embodiment, the student system 11 is trained to imitate the reference system 51, with the learning coach 41 optimizing some combined measure of cost of error and cost of computation. However, rather than the reference system 51 being selected to create experiments to train the learning coach 41 as in FIG. 12B, the learning experimentation system and coach 6141 creates reference systems from which the student learning system 11 can learn to approximately imitate the reference system 51 as a means of transfer learning from the more complex reference system 51 to the simpler student learning system 11.

In another embodiment, the learning experimentation system and coach 6141 uses an ensemble reference system 51 to train a simpler classifier to be a preliminary classifier such as preliminary classifier 803 in FIG. 14. In this embodiment, the learning experimentation system and coach 6141 does not train the student learning system 11 to the imitate reference system 51, but rather, as in FIG. 14, the student system 11 is trained to predict the probability that each member of the ensemble in reference system 51 will correctly classify a given item. However, rather than having the student learning system 11 learn to make such predictions for a fixed ensemble, such as the ensemble components 801a-d in FIG. 14, in this embodiment the learning experimentation system and coach 6141 can make changes in the ensemble reference system 51 to make the student system 11 more effective in its predictions.

As a further aspect of this illustrative embodiment, the learning experimentation system and coach 6141 can directly transfer knowledge from the reference system 51 to the learning system 11 by copying subnetworks from the reference system 51 to the student system 11, as described in association with FIG. 16, subject to the objective of optimizing the combination of cost and performance for the student learning system 11.

Based on the above description, it is clear that embodiments of the present invention can be used to improve operation, including the learning, of machine learning systems, including deep neural networks, in a variety of applications. For example, embodiments of the present invention can improve recommender systems, speech recognition systems, and classification systems, including image and diagnostic classification systems, to name but a few examples, such as by improving their learning hyperparameters, internal structure, and training examples, or any of the other techniques described herein.

The computer systems described herein, such as the student ML system 11, the learning coach ML system 41, the reference system 51 and the learning experimentation system 61, can be implemented with computer hardware and software. For example, they could be part of an integrated computer system (e.g., a server or network of servers) that has multiple processing cores. The program instructions could be stored in computer memory, such as RAM, ROM, processor registers or processor cache, etc., that is accessible by the processing cores. The processor cores may comprise CPU or graphical processing unit (GPU) cores. GPU cores operate in parallel and, hence, can typically process data more efficiently that a collection of CPU cores, but all the cores execute the same code at one time. As described herein, the various machine learning systems could be part of a distributed computer system (see, e.g., FIGS. 4-5 and 11). In such embodiments, the computer devices (e.g., servers) that implement the students and coaches may be remote from each other and interconnected by data networks, such as a LAN, WAN, the Internet, etc., using suitable wired and/or wireless data communication links. Data may be shared between the various systems using suitable data links, such as data buses (preferably high-speed data buses) or network links (e.g., Ethernet).

The software for the various computer and machine learning systems described herein (e.g., student ML system 11, the learning coach ML system 41, the reference system 51 and the learning experimentation system 61) and other computer functions described herein may be implemented in computer software using any suitable computer programming language such as .NET, C, C++, Python, and using conventional, functional, or object-oriented techniques. For example, the various computer and machine learning systems may be implemented with software modules stored or otherwise maintained in computer readable media, e.g., RAM, ROM, secondary storage, etc. One or more processing cores (e.g., CPU or GPU cores) of the computer or machine learning system may then execute the software modules to implement the function of the respective computer or machine learning system described herein (e.g., student, coach, etc.). Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, the present invention is therefore directed to a machine learning system that comprises (i) a first student machine learning system 11 that, using machine learning, automatically learns from and makes predictions on input source data; and (ii) a first learning coach machine learning system 41 that is in communication with the first student machine learning system. Input to the first learning coach machine learning system comprises data about an internal state of the first student machine learning system. Also, the learning coach machine learning system, using machine learning, automatically learns and implements an enhancement to the first student machine learning system based on the data about the internal state of the first student machine learning system to improve operation of the first student machine learning system.

In various implementations, the first learning coach machine learning system comprises a pattern recognition system that recognizes different patterns than the first student machine learning system. Also, the first student machine learning system can have a different objective than the first student machine learning system. Also, the first learning coach machine learning system and the first student machine learning system may have the same network architectures; for example, either one of them could comprise a deep neural network.

In various implementation, the enhancement comprises one or more revised hyperparameters for the first student machine learning system that improve learning by the first student machine learning system; a structural change the first student machine learning system; selectively controlling training data input to the first student machine learning system to control the learning of the first student machine learning system; and/or, where the first student machine learning system comprises an ensemble, selectively controlling data flow to members of the ensemble or adding new members to the ensemble. The revised hyperparameters could be a minibatch size for the first student machine learning system; a learning rate for the first student machine learning system; a regularization parameter for the first student machine learning system; and/or a momentum parameter for the first student machine learning system. The structural changes could comprise one or more additional nodes and/or one or more additional layers to be added to a selected layer of a network of the first student machine learning system.

In another general aspect, the present invention is directed to a machine learning (ML) computer system that comprises: a student ML system 11; a learning coach ML system 41 that is in communication with the student ML system 11; and a computerized reference system 51 for generating a set of training data for the student ML system 11. The learning coach ML system 41 is for learning an enhancement to the student ML system 11 based on a training of the student ML system 11 with the set of training data generated by the reference system 51.

In another general aspect, the present invention is directed to a computer-implemented method of improving operation of a student ML system. The method comprises the steps of: (i) generating, by a computerized reference system 51, a set of training data for the student ML system; (ii) training the student ML system 11 on the set of training data generated by the reference system 51; (iii) receiving, by a learning coach ML system 41, from the student ML system 11, data about an internal state of the student ML system 11 as the student ML system 11 is being trained on the set of training data generated by the reference system 51; and (iv) using machine learning, automatically learning and implementing, by the learning coach ML system 41, an enhancement to the student ML system 11 based on the data about the internal state of the student ML system 11 to improve operation of the student ML system 11.

In various implementations, the reference system 51 comprises at least one classifier 5102, 5103 for classifying input data to generate classified data as the set of training data for the student ML system 11. The at least one classifier of the reference system 51 can comprises a ML system that can be different from or the same as the student ML system 11, in terms of structure (e.g., layers and nodes for a neural network). Where the systems are identical, they can have different trainable parameters (e.g., different connection weights for neural networks).

Also, the reference system can add noise to the classified data to generate the set of training data, as shown in FIG. 12C.

In addition, a computerized learning experimentation system 61 can transmit a control parameter to the reference system 51, e.g., $\phi$, where the control parameter controls generation of the set of training data by the reference system 51. For example, the learning experimentation system 61 can control the reference system 51 such that the student ML system 11 is trained to imitate the reference system 51. Also, the learning experimentation system 61 can determine a cost function for the learning coach ML system 41 based on observations from the reference system 51 and the student ML system 11. The learning coach ML system 41 can use the cost function in learning the enhancement for the student ML system 11.

In other various implementations, the reference system comprises two or more classifiers 5102, 5103 for classifying the input data to generate classified data, and randomly selects the classified data from the two of more classifiers as the set of training data for the student ML system 11. In such embodiments, the learning experimentation system 61 can provide a tunable control parameter, e.g., $\phi$, to the reference system 51 that controls a probability at which the reference system 51 randomly selects the classified data from each of the two or more classifiers 5102, 5103 to be the set of training data. In addition, as before, each of the two or more classifiers of the reference system 51 can comprise a ML system that is identical to or different from, in structure (e.g., nodes and layers), the student ML system 11. Also, the classifiers of the reference system 51 could have identical or different structures. Further, the reference system could comprise an ensemble of classifiers. In such embodiments, the learning experimentation system 61 can transmit a control parameter to the reference system that controls how the reference system combines the output from the multiple ML ensemble members of the reference system, to thereby control generation of the set of training data by the reference system.

In various implementations, the learning coach ML system 41 comprises a pattern recognition system that recognizes patterns of learning performance of a ML system. Also, the student ML system 11 may have a different objective than the learning coach ML system 41. The enhancement to the student ML system determined by the learning coach 41 can comprise, for example, one or more revised hyperparameters for the student ML system that improve learning by the student ML system or a structural change to the student ML system.

The student ML system 11, the learning coach ML system 41, the reference system 51 and/or the learning experimentation system can comprise a graphics processing unit that comprises multiple processing cores on a single integrated circuit.

In another general aspect, the present invention is directed to a ML computer system comprising: a first set of one or more processing cores; a first set of one or more computer readable media; and a student ML module maintained on the first set of one or more computer readable media that, when executed by the first set of one or more processing cores, causes the first set of one or more processing cores to, using machine learning, automatically learn from and make predictions on input source data. The ML system also comprises: a second set of one or more processing cores; a second set of one or more computer readable media; and a reference system module maintained on the second set of computer readable media that, that when executed by the second set of one or more processing cores, causes the second set of one or more processing cores to generate a set of training data for the student ML system. The ML system also comprises: a third set of one or more processing cores; a third set of one or more computer readable media; a learning coach ML module maintained on the third set of computer readable media that, when executed by the third set of one or more processing cores, causes the third set of one or more processing cores to: (i) receive as input data about an internal state of the student ML module as the student ML module is being trained on the set of training data generated by the reference system module; and (ii) using machine learning, automatically learn and implement a change to the student ML module based on the data about the internal state of the student ML module to improve operation of the student ML module.

In various implementations, the ML system could also comprise a fourth set of one or more processing cores; a fourth set of one or more computer readable media; and a learning experimentation module maintained on the fourth set of one or more computer readable media that, when executed by the fourth set of one or more processing cores, causes the fourth set of one or more processing cores to determine and transmit a control parameter to the reference system module, wherein the control parameter controls generation of the set of training data by the reference system module.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A machine learning (ML) computer system for training a student ML system iteratively through machine learning on training data to perform a machine learning task, wherein:
the student ML system comprises an input layer, an output layer, and at least a first inner layer between the input and output layers;
each layer comprises at least one node, such that the first inner layer comprises at least a first node;
the first node of the first inner layer outputs an activation value for each set of input values to the first node of the first inner layer;
the activation value is determined based on an activation function for the first node of the first inner layer and based on learned parameters for the first node of the first inner layer; and
following iterations of the training of the student ML system, the learned parameters for the first node of the first inner layer are updated,
wherein the machine learning computer system comprises:
a learning coach ML system that is in communication with the student ML system, wherein the learning coach ML system has been trained through machine learning to determine one or more revised hyperparameter values for the student ML system, wherein each of the one or more revised hyperparameter values controls an aspect of the machine learning by the student ML system, and wherein the learning coach ML system comprises an input layer and an output layer, and wherein the learning coach ML system determines the one or more revised hyperparameter values for the student ML system based on input to the learning coach ML system from the student ML system, wherein the input to the learning coach ML system from the student ML system is input to the input layer of the learning coach ML system, and wherein the input from the student ML system comprises observations about an internal state of the student ML system during training of the student ML system, wherein the observations about the internal state of the student ML system comprise values related to the learned parameters for the first node on the first inner layer of the student ML system and the activation values for the first node on the first inner layer of the student ML system; and
a reference system for generating a set of additional training data for the student ML system, wherein the reference system comprises a ML system, wherein the additional training data generated by the reference system are input to the input layer of the student ML system, and wherein the learning coach ML system has been trained, through machine learning, to determine the one or more revised hyperparameter values for the student ML system that is implemented by the student ML system based on the observations about the first node on the first inner layer of the student ML system from a training of the student ML system with the set of additional training data generated by the reference system.

2. The ML computer system of claim 1, wherein the reference system comprises at least one classifier for classifying input data to generate classified data as the set of additional training data for the student ML system.

3. The ML computer system of claim 2, wherein the at least one classifier of the reference system comprises a ML system.

4. The ML computer system of claim 3, wherein the at least one classifier of the reference system has a different ML structure than the student ML system.

5. The ML computer system of claim 3, wherein the at least one classifier of the reference system has an identical ML structure as the student ML system.

6. The ML computer system of claim 2, wherein the reference system adds noise to the classified data to generate the set of additional training data.

7. The ML computer system of claim 3, further comprising a learning experimentation system that is in communication with the reference system, wherein the learning experimentation system comprises a computer, and wherein the learning experimentation system transmits a control parameter to the reference system, wherein the control parameter controls generation of the set of additional training data by the reference system.

8. The ML computer system of claim 7, wherein the learning experimentation system controls the reference system such that the student ML system is trained to imitate the reference system.

9. The ML computer system of claim 7, wherein:
the learning experimentation system:
is in communication with the learning coach ML system; and
further determines a cost function for the learning coach ML system based on observations from the reference system and the student ML system; and
the learning coach ML system uses the cost function in learning the one or more revised hyperparameter values for the student ML system.

10. The ML computer system of claim 2, wherein the reference system:
comprises two or more classifiers for classifying the input data to generate classified data; and
randomly selects the classified data from the two or more classifiers as the set of additional training data for the student ML system.

11. The ML computer system of claim 10, further comprising a computerized learning experimentation system that is in communication with the reference system, wherein the learning experimentation system provides a tunable control parameter to the reference system that controls a probability at which the reference system randomly selects the classified data from each of the two or more classifiers to be the set of additional training data.

12. The ML computer system of claim 10, wherein the reference system adds noise to output of each of the two or more classifiers prior to randomly selecting the classified data from two or more classifiers to be the set of additional training data.

13. The ML computer system of claim 1, wherein:
the reference system comprises an ensemble of multiple ML ensemble members;
the ML computer system further comprises a computerized learning experimentation system that is in communication with the reference system;

the learning experimentation system transmits a control parameter to the reference system;

the control parameter controls generation of the set of additional training data by the reference system; and the control parameter comprises combining weights for combining output from the multiple ML ensemble members of the reference system.

14. The ML computer system of claim 1, wherein the learning coach ML system comprises a pattern recognition system that recognizes patterns of learning performance of a ML system.

15. The ML computer system of claim 1, wherein the student ML system has a different objective than the learning coach ML system.

16. The ML computer system of claim 1, wherein the one or more revised hyperparameter values comprise a revised learning rate hyperparameter value for the student ML system.

17. The ML computer system of claim 1, wherein the one or more revised hyperparameter values comprise a revised learning regularization hyperparameter value for the student ML system.

18. The ML computer system of claim 1, wherein the one or more revised hyperparameter values comprise a revised momentum hyperparameter value for the student ML system.

19. The ML computer system of claim 1, wherein:

the student ML system comprises multiple connection weights between nodes of the student ML system, including a first connection weight and a second connection weight; and the one or more revised hyperparameters comprise a first value for a first hyperparameter for the first connection weight of the student ML system and a second value for the revised hyperparameter for the second connection weight of the student ML system.

20. A computerized method of improving operation of a student ML system, the method comprising:

initial training, iteratively through machine learning, the student ML system on training data to perform a machine learning task, wherein:

the student ML system comprises an input layer, an output layer, and at least a first inner layer between the input and output layers;

each layer comprises at least one node, such that the first inner layer comprises at least a first node;

the first node of the first inner layer outputs an activation value for each set of input values to the first node of the first inner layer;

the activation value is determined based on an activation function for the first node of the first inner layer and based on learned parameters for the first node of the first inner layer; and the initial training the student ML system comprises, following iterations of the training of the student ML system, updating the learned parameters for the first node of the first inner layer;

generating, by a reference system, a set of additional training data for the student ML system, wherein the reference system comprises a ML system and comprises a computer;

following the initial training of the student ML system:

training the student ML system on the set of additional training data generated by the reference system, wherein the additional training data are input to the input layer of the student ML system;

receiving, by a learning coach ML system, from the student ML system, observations about an internal state of the student ML system as the student ML system is being trained on the set of training data generated by the reference system, wherein:

the learning coach ML system has been trained through machine learning to determine one or more revised hyperparameter values for the student ML system, wherein each of the one or more revised hyperparameter values controls an aspect of the machine learning by the student ML system;

the learning coach ML system comprises an input layer and an output layer;

the learning coach ML system determines the one or more revised hyperparameter values for the student ML system based on input to the learning coach ML system from the student ML system;

the input to the learning coach ML system from the student ML system is input to the input layer of the learning coach ML system;

the input from the student ML system to the learning coach ML system comprises the observations about the internal state of the student ML system; and the observations about the internal state of the student ML system comprise values related to the learned parameters and the activation values of the first node of the first inner layer of the student ML system; and determining, by the learning coach ML system, the one or more revised hyperparameter values for the student ML system based on the observations about the first node of the first inner layer of the student ML system from training on the set of additional training data generated by the reference system to improve operation of the student ML system.

21. The method of claim 20, wherein the reference system comprises at least one classifier for classifying input data to generate classified data as the set of additional training data for the student ML system.

22. The method of claim 21, further comprising adding noise, by the reference system, to the classified data to generate the set of additional training data.

23. The method of claim 20, further comprising transmitting, by a learning experimentation system that is in communication with the reference system, a control parameter to the reference system, wherein the control parameter controls generation of the set of additional training data by the reference system, wherein the learning experimentation system comprises a computer.

24. The method of claim 23, wherein the learning experimentation system controls the reference system such that the student ML system is trained to imitate the reference system.

25. The method of claim 23, further comprising determining, by the learning experimentation system, a cost function for the learning coach ML system based on observations from the reference system and the student ML system, wherein the learning coach ML system uses the cost function in learning the one or more revised hyperparameter values for the student ML system.

26. The method of claim 21, wherein:

the reference system comprises two or more classifiers for classifying the input data to generate classified data; and the method further comprises randomly selecting, by the reference system, the classified data from the two or more classifiers as the set of additional training data for the student ML system.

27. The method of claim 26, further comprising providing, by a computerized learning experimentation system that is in communication with the reference system, a tunable control parameter to the reference system that controls a probability at which the reference system randomly selects the classified data from each of the two or more classifiers to be the set of additional training data.

\* \* \* \* \*